United States Patent
Kim et al.

(10) Patent No.: US 11,758,023 B2
(45) Date of Patent: Sep. 12, 2023

(54) MULTICORE ELECTRONIC DEVICE AND PACKET PROCESSING METHOD THEREOF

(71) Applicant: Samsung Electronics Co., Ltd., Suwon-si (KR)

(72) Inventors: Youngwook Kim, Suwon-si (KR); Wonbo Lee, Suwon-si (KR); Youngki Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 451 days.

(21) Appl. No.: 16/823,512

(22) Filed: Mar. 19, 2020

(65) Prior Publication Data

US 2020/0301745 A1 Sep. 24, 2020

(30) Foreign Application Priority Data

Mar. 22, 2019 (KR) .......................... 10-2019-0032915

(51) Int. Cl.
*H04L 69/12* (2022.01)
*G06F 9/50* (2006.01)
(Continued)

(52) U.S. Cl.
CPC ............ *H04L 69/12* (2013.01); *G06F 9/5061* (2013.01); *G06F 18/23* (2023.01); *H04L 49/90* (2013.01); *H04L 67/146* (2013.01)

(58) Field of Classification Search
CPC ..... G06F 9/38; G06F 9/48; G06F 9/50; G06F 9/3885; G06F 9/4881; G06F 9/4843;
(Continued)

(56) References Cited

U.S. PATENT DOCUMENTS 5,506,987 A 4/1996 Abramson et al.
8,452,835 B2 * 5/2013 Raja ..................... H04L 43/0894
709/219
(Continued)

FOREIGN PATENT DOCUMENTS

KR 10-2010-0070556 A 6/2010
KR 10-2014-0134190 A 11/2014
(Continued)

OTHER PUBLICATIONS

International Search Report dated Jun. 23, 2020; International Appln. No. PCT/KR2020/003870.
(Continued)

*Primary Examiner* — James N Fiorillo
(74) *Attorney, Agent, or Firm* — Jefferson IP Law, LLP

(57) ABSTRACT

A multicore electronic device is provided. The multicore electronic device includes a multicore including a plurality of cores, each core being configured to process packets in a driver core layer, a network processing core layer, and an application core layer, and a memory configured to store executions instructions for causing a first core of the plurality of cores to, when the packets are received, identify a location of a driver core for delivering the packets to an operating system domain, a location of an application core for processing the packets in a user domain, and a processing amount, determine a location of a network processing core for processing the packets based on at least one of the location of the driver core, the location of the application core, and the processing amount of the session, and control the network processing core to perform network stack processing on the packets.

18 Claims, 16 Drawing Sheets

(51) Int. Cl.
*H04L 67/146* (2022.01)
*H04L 49/90* (2022.01)
*G06F 18/23* (2023.01)

(58) Field of Classification Search
CPC .... G06F 9/5027; G06F 9/5044; G06F 9/5055; G06F 9/5061; G06F 9/5077; G06F 9/5083; G06F 9/45558; G06F 13/36; G06F 13/1642; G06K 9/62; G06K 9/6218; H04L 69/12; H04L 69/16; H04L 69/90; H04L 69/161; H04L 67/146; H04L 67/1006; H04L 45/74; H04L 43/028; H04L 29/06; H04L 12/26; H04L 12/56; H04L 47/34; H04W 28/08; H04W 16/11
USPC ........................................................ 709/232
See application file for complete search history.

(56) References Cited

U.S. PATENT DOCUMENTS

| | | | | |
|---|---|---|---|---|
| 8,799,624 | B1* | 8/2014 | Griffin | G06F 13/4221 712/29 |
| 8,949,414 | B2 | 2/2015 | Raja | H04L 43/028 709/224 |
| 9,069,553 | B2* | 6/2015 | Zaarur | G06F 9/44 |
| 11,625,284 | B2* | 4/2023 | Sivaramakrishnan | G06F 9/45558 718/1 |
| 2008/0002702 | A1 | 1/2008 | Bajic et al. | |
| 2010/0077403 | A1* | 3/2010 | Yang | G06F 9/4881 718/104 |
| 2010/0162253 | A1 | 6/2010 | Jeong | |
| 2010/0241831 | A1 | 9/2010 | Mahadevan et al. | |
| 2010/0284404 | A1* | 11/2010 | Gopinath | H04L 67/1001 370/392 |
| 2010/0322252 | A1* | 12/2010 | Suganthi | H04L 69/12 709/237 |
| 2011/0153839 | A1* | 6/2011 | Rajan | H04L 69/16 709/227 |
| 2011/0153982 | A1* | 6/2011 | Partridge | G06F 15/7807 712/16 |
| 2012/0033673 | A1* | 2/2012 | Goel | H04L 49/70 370/400 |
| 2013/0205037 | A1 | 8/2013 | Biswas | |
| 2014/0281385 | A1* | 9/2014 | Tu | H04L 49/1546 712/43 |
| 2014/0303934 | A1* | 10/2014 | Mylarappa | G06F 11/00 702/186 |
| 2014/0304393 | A1* | 10/2014 | Annamalaisami | G06F 11/3495 709/224 |
| 2015/0046685 | A1* | 2/2015 | Park | G06F 1/206 712/220 |
| 2015/0124828 | A1* | 5/2015 | CJ | H04L 12/4633 370/392 |
| 2015/0143383 | A1 | 5/2015 | Seo et al. | |
| 2015/0263974 | A1 | 9/2015 | Jain et al. | |
| 2016/0050111 | A1 | 2/2016 | Jang et al. | |
| 2016/0171390 | A1* | 6/2016 | Mohammad Mirzaei | G06N 20/00 706/12 |
| 2016/0378538 | A1* | 12/2016 | Kang | G06F 9/45558 718/1 |
| 2016/0378545 | A1* | 12/2016 | Ho | G06F 9/4843 718/107 |
| 2017/0287085 | A1* | 10/2017 | Smith | G01S 5/0244 |
| 2017/0364132 | A1* | 12/2017 | Gendler | G06F 1/3243 |
| 2018/0024960 | A1* | 1/2018 | Wagh | H04L 69/04 710/313 |
| 2018/0213440 | A1* | 7/2018 | Mahapatra | H04L 67/146 |
| 2018/0336067 | A1* | 11/2018 | Lee | H04L 47/34 |
| 2018/0365176 | A1* | 12/2018 | Finkelstein | H04L 47/34 |
| 2019/0258251 | A1* | 8/2019 | Ditty | G06F 15/7807 |
| 2020/0021533 | A1* | 1/2020 | Sung | H04L 47/36 |
| 2020/0314037 | A1* | 10/2020 | Kim | H04L 49/9005 |
| 2021/0176302 | A1* | 6/2021 | Bharti | H04L 67/1008 |

FOREIGN PATENT DOCUMENTS

| | | |
|---|---|---|
| KR | 10-2016-0019824 A | 2/2016 |
| KR | 10-2017-0125564 A | 11/2017 |
| KR | 10-1873110 B1 | 6/2018 |

OTHER PUBLICATIONS

Buh et al.; Adaptive network-traffic balancing on mulit-core software networking devices; Computer Networks 69 (2014) 19-34; Apr. 29, 2014; XP028860624; Elsevier, Amsterdam, NL.

European Search Report dated Mar. 11, 2022; European Appln No. 20779866.1-1203 / 3928204 PCT/KR2020003870.

* cited by examiner

MULTICORE ELECTRONIC DEVICE AND PACKET PROCESSING METHOD THEREOF

CROSS-REFERENCE TO RELATED APPLICATION(S)

This application is based on and claims priority under 35 U.S.C. § 119(a) of a Korean patent application number 10-2019-0032915, filed on Mar. 22, 2019, in the Korean Intellectual Property Office, the disclosure of which is incorporated by reference herein in its entirety.

BACKGROUND

1. Field

The disclosure relates to a multicore electronic device and packet processing method thereof.

2. Description of Related Art 5G is the $5^{th}$ generation technology standard for low latency and high throughput communication. A communication system for providing 5G network services uses highly sophisticated hardware and software technologies to achieve a high data rate.

For example, in order for an electronic device to support 5G network services, it is necessary to use multiple processors (e.g., multicore processor) in view of hardware and a technology for processing received packets in parallel simultaneously on multiple cores in view of software. The importance of the software-based multicore packet distribution processing technology consists in distributing received packets to the cores efficiently. Examples of such a packet distribution processing technology may include receive packet steering (RPS) and receive flow steering (RFS) introduced in the Linux operating system (OS).

RPS is a technique for allowing network stack (e.g. Transmission Control Protocol/Internet Protocol (TCP/IP) layer) processing to be done on packets by assigning cores randomly according to a session of the packet. RFS is a technique for determining a core for network stack processing on a received packet by matching an application core for a receiving session to the core for network stack processing.

Meanwhile, it may be possible for an electronic device to adopt a new Application Programming Interface (API) (NAPI) technique for notifying a packet arrival status to a kernel when a packet arrives at a network interface. The NAPI is a technique for processing data efficiently in such a way of batching, when a predetermined number of packets are received, and delivering the batch of packets to the upper layer.

The above information is presented as background information only to assist with an understanding of the disclosure. No determination has been made, and no assertion is made, as to whether any of the above might be applicable as prior art with regard to the disclosure.

SUMMARY

The receive packet steering (RPS) technique, which randomly selects a core for processing packets without consideration of the status of applications and cores, may cause delay or failure to optimize throughput of a multicore processor. For example, if the capabilities of a driver task processing core and a network stack processing core do not satisfy the demands of an application, it is difficult to perform batching in a new Application Programming Interface (API) (NAPI) and transmission control protocol (TCP) processing procedure, which leads to low throughput and inefficient operation. In the case of the receive flow steering (RFS) technique, even when packets are processed by a network core located at the same location as the application core, if the packets arrive in a single session or are concentrated in a specific session, a load (or overhead) is applied to the corresponding core, resulting in failure to achieve full use of multicore performance.

Aspects of the disclosure are to address at least the above-mentioned problems and/or disadvantages and to provide at least the advantages described below. Accordingly, an aspect of the disclosure is to provide a multicore electronic device for batching packets and processing the batched packets in a distributed manner, and a core determination method and apparatus thereof that are capable of reducing unnecessary overheads and guaranteeing a higher performance by maximize a batch size of packets in consideration of the performances and interoperations of driver cores, network cores, and application cores.

Additional aspects will be set forth in part in the description which follows and, in part, will be apparent from the description, or may be learned by practice of the presented embodiments.

In accordance with an aspect of the disclosure, a multicore electronic device is provided. The multicore electronic device includes a communication circuit, a multicore including a plurality of cores, each core being configured to process packets in a driver core layer, a network processing core layer, and an application core layer, and a memory configured to store instructions for a first core of the plurality of cores to, when the packets are received by the communication circuit, identify a location of a driver core for delivering the packets to an operating system domain, a location of an application core for processing the packets in a user domain, and a processing amount of a session corresponding to the packets, determine a location of a network processing core for processing the packets based on at least one of the location of the driver core, the location of the application core, and the processing amount of the session, and control the network processing core to perform network stack processing on the packets delivered to the operating system domain.

In accordance with another aspect of the disclosure, an electronic device is provided. The electronic device includes a communication circuit, a multicore comprising a plurality of cores, each core being configured to process packets in a driver core layer, a network processing core layer, and an application core layer, a memory, and a processor configured to when the packets are received by the communication circuit, control to identify a location of a driver core for delivering, the packets, from one of multiple cores, to an operating system domain, a location of an application core for processing the packets in a user determine a location of a network processing core for processing the packets among the plurality of cores based on at least one of the location of the driver core, the location of the application core, and the processing amount of the session, and control to perform network stack processing on the packets using the network processing core.

According to various disclosed embodiments may determine a location of an application core for processing packets and select a network processing core for TCP/IP stack processing based on the locations of a driver core and the application core for processing received packets and a packet processing amount per session. The proposed method is advantageous in terms of improving a batch processing performance and efficiency of a multicore electronic device by using a core showing a capability equal to or greater in a lower layer than that in a higher layer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description, taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
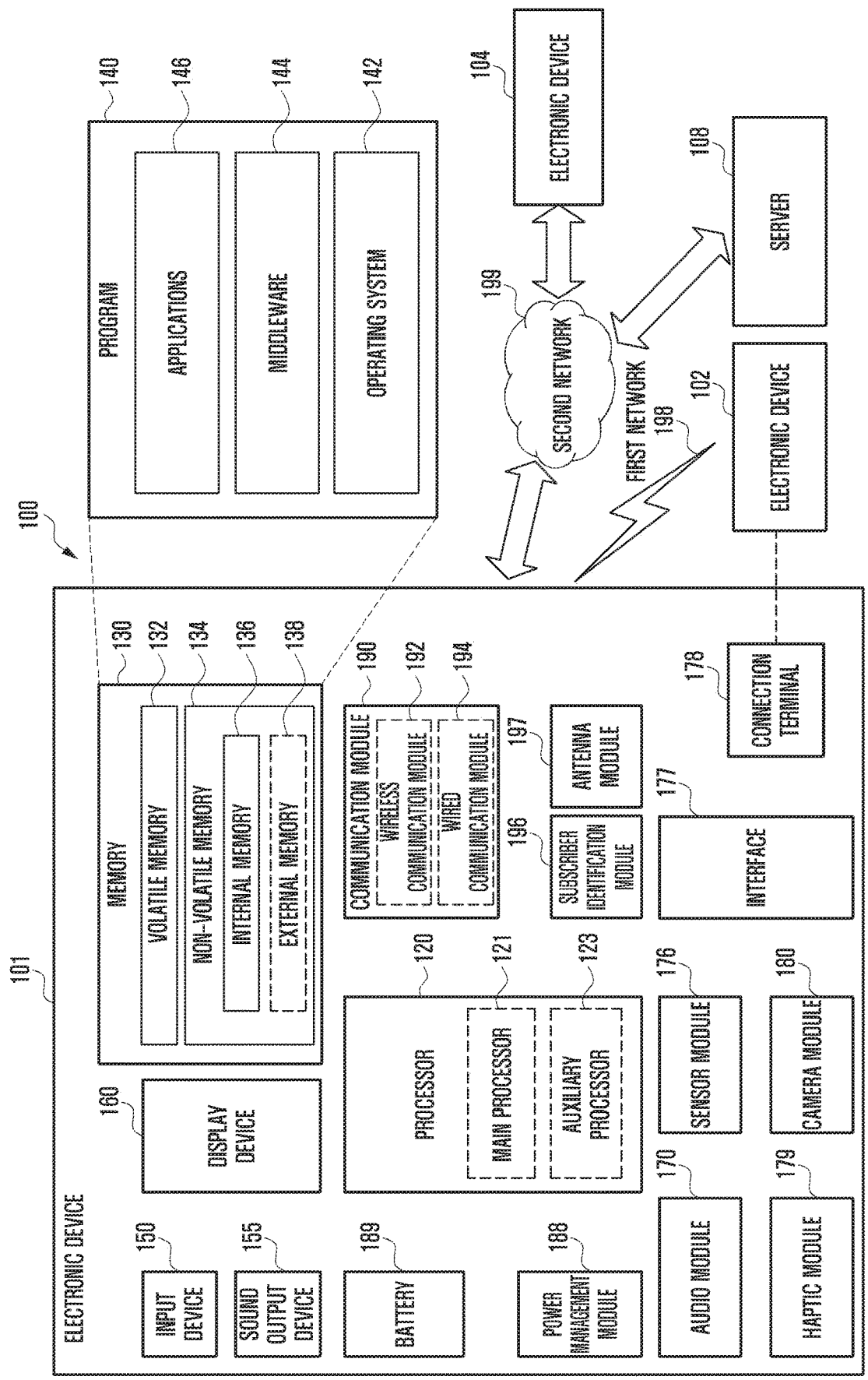
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to various embodiments, the processor 120 of the electronic device 101 may include N cores. The N cores may include a high performance core (e.g., big core) consuming more power and having more processing capability and a low performance core (e.g., little core) consuming less power and having less processing capability.

According to various embodiments, in the network environment 100, the electronic device 101 may receive packets from the network and process the received packets using multiple cores in a distributed manner. For example, the cores may be hierarchically organized to process packets on their own layers: a driver core for delivering the received packets to an upper layer, a network processing core for network stack processing, and an application core for application processing in a user domain.

A description is made of the multicore electronic device 101 and a method for determining a location of a network processing core for network stack processing in consideration of a location of a driver core and a location of an application core in the electronic device 101.

Figure 2:
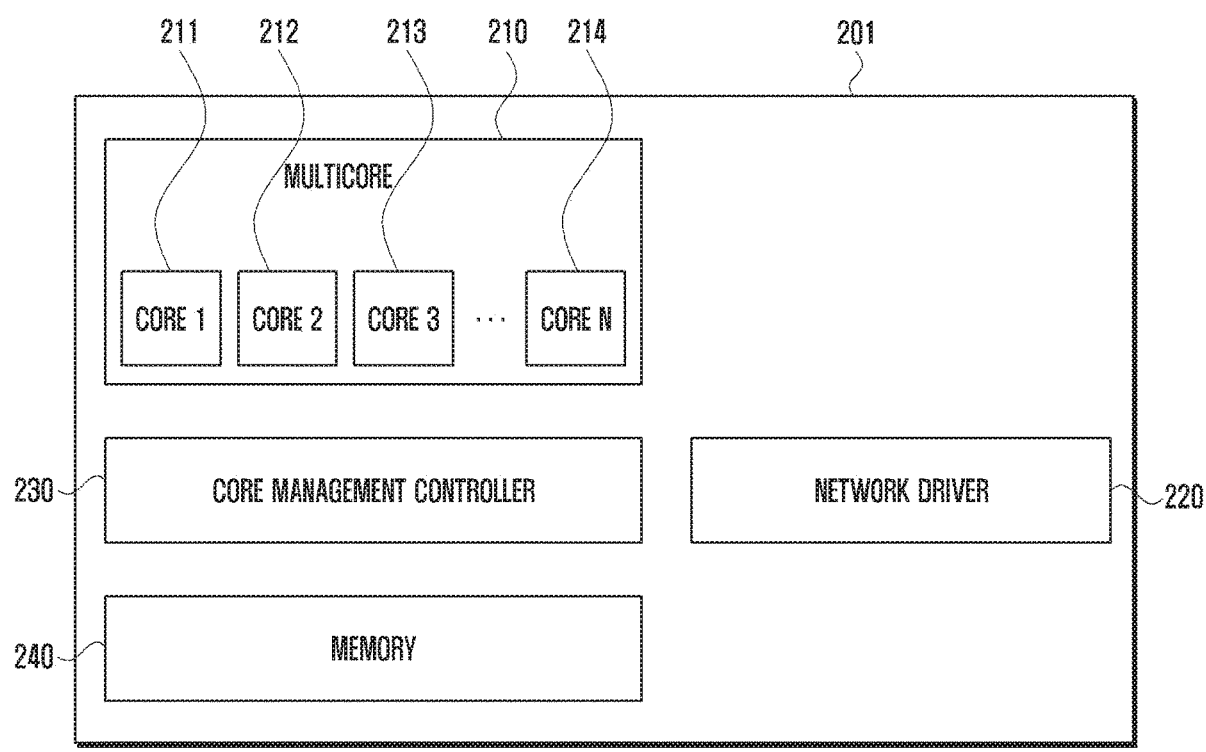
FIG. 2 is a block diagram illustrating a configuration of a multicore electronic device according to an embodiment of the disclosure.

FIG. 2 is a block diagram illustrating a configuration of a multicore electronic device according to an embodiment of the disclosure.

Referring to FIG. 2, the multicore electronic device 201 (e.g., electronic device 101 in FIG. 1) may include a multicore 210 (e.g., processor 120 in FIG. 1), a network driver 220, a core management controller 230, and a memory 240 (e.g., memory 130 in FIG. 1).

According to an embodiment, the multicore 210 may be a processor including at least N cores 211, 212, 213, and 214. The description is directed to, but is not limited to, the case where the multicore 210 includes first type cores (e.g., high performance core, high power core, and big core) and second type cores (e.g., low performance core, low power core, and little core). The quantity of the first type cores and the second type cores may be determined depending on the specification (spec) of the electronic device.

According to an embodiment, the N cores included in the multicore 210 may be referred to with a core number (e.g., core 0, core 1, core 2, core 4, and core N). The cores included in the multicore 210 may be categorized into one of a first cluster and a second cluster according to their performance. The electronic device 201 may categorize cores into one of the clusters according to the core numbers. For example, presuming 8 cores, cores 4 to 7 fall into the first cluster while cores 0 to 3 fall into the second cluster. The electronic device 201 may identify whether a core belongs to the first cluster or the second cluster based on the core number.

According to an embodiment, the network driver 220 may include a network interface card (NIC) (not shown). The network driver 220 may be implemented as a software component for network communication with another device. According to an embodiment, the network driver 220 may be connected to a modem (e.g., local area network (LAN) card) of a communication processor via a peripheral component interconnect (PCI) express interface. According to various embodiments, the NIC may include, but is not limited to, a LAN card. The electronic device 201 may connect to a network via a wireless or wired connection. The electronic device 101 may connect to a network using a media access control (MAC) address of the MC or modem.

According to an embodiment, the network driver 220 (e.g., NIC) may include a receive (Rx) buffer (not shown) for queuing received packets and a transmit (Tx) buffer (not shown) for queuing packets processed by an application in the user domain for transmission.

According to an embodiment, the network driver 220 may receive packets through network communication with another electronic device. According to an embodiment, the network driver 220 may be mounted in a kernel and receive an interrupt signal for an incoming packet from the NIC (or communication processor including a modem). The kernel may include an OS (e.g., OS 142 in FIG. 1). For example, it may be possible to receive a plurality of packets, and a plurality of packets may be delivered to different layer cores.

According to an embodiment, the core management controller 230 may be driven by at least one core of the multiple cores of the multicore 210 or as a part of the processor 120 in FIG. 1.

According to an embodiment, the core management controller may be a hardware component configured to operate independently from the multicore 210.

According to another embodiment, the core management controller 230 may be a software program (e.g., program 140 in FIG. 1). For example, the core management controller 230 as a software component may be stored in the form of commands (or instructions) in the memory 240 executable by the processor 120.

According to an embodiment, the core management controller 230 may detect execution of an application, assign one of the multiple cores to the application, and control the multicore 210.

According to an embodiment, the core management controller 230 may monitor the information on a session of the packets being communicated via the network to determine a location (i.e., identity) of a core for processing the packets. For example, the location of the core may include the core number or cluster type information. According to an embodiment, the core management controller 230 may acquire at least one of a session ID of packets, an identifier (e.g., a number) of the driver core that delivered the packet to a concurrent processing engine, an identifier of an application (e.g., application for processing the packet) core related to the session ID, and/or processing information per session. For example, the concurrent processing engine may be a software component running on the OS (e.g., OS 142 in FIG. 1) and understood as an engine for identifying the packets received from the network with session IDs and processing the packets on the cores in a distributed manner.

According to an embodiment, the core management controller 230 may determine an identifier (e.g., a number) of the network processing core for network stack (e.g., TCP/IP stack) processing on the packets based on the information received from the concurrent processing engine.

According to an embodiment, the core management controller 230 may determine a cluster type of the network processing core for network stack (e.g., TCP/IP stack) processing on the packets based on the information received from the concurrent processing engine.

According to an embodiment, the core management controller 230 may monitor the location of the application core for processing data in the user domain to detect a change of the location of the application core and change the location of the network processing core based on the change of the location of the application core.

According to an embodiment, the core management controller 230 may monitor an operation status of the application to determine a location of the application core and, if necessary, control to change the location of the application core. For example, the location of the application core may include information indicating a core number or a cluster type. For example, if it is necessary to change from the high performance core to the low performance core in the application layer, the core management controller 230 may select one of the cores in the low power cluster and designate the selected low power core as the application core.

According to an embodiment, the core management controller 230 may check the operation times of the cores processing applications and the number of packets being processed by the cores based on the session ID and, if the operation time of a certain core is greater than a threshold value, determine a location of the application core based on the core cluster to which the core processing the application belongs. For example, if the application core for processing packets related to an audio playback application belongs to the high performance cluster, the location of the application core corresponding to the audio playback application may be determined as a high performance core.

According to an embodiment, the core management controller 230 may determine the location of the application core based on whether the application is running in the foreground or the background.

According to an embodiment, the core management controller 230 may predesignate a core location for a specific application or designate the location of the application core through machine learning.

According to an embodiment, the core management controller 230 may check a packet processing level (e.g., low, medium, and high) to determine a network processing core of the related session.

According to an embodiment, the core management controller 230 may change the threshold value based on at least one of the location of the application core, the location of the driver core for delivering packets to the concurrent processing engine, and characteristic information of the application, and determine a network processing core by comparing the threshold level to the threshold value. The packet processing amount of the application may be the amount of packet data being processed in a unit of time and expressed by units of bytes per second (BPS), bits per second (bPS), or packets per second (PPS).

According to an embodiment, the core management controller 230 may change the threshold value for the packet processing amount of the application according to the location of the main core executing the application.

According to an embodiment, the core management controller 230 may change the threshold value for the packet processing amount of the application according to whether the application is running in the foreground or the background.

According to an embodiment, the core management controller 230 may change the threshold value for the packet processing amount of the application according to the location of the application core based on predetermined information or learned information.

According to an embodiment, the memory 240 may include at least one of dynamic random access memory (DRAM), static random access memory (SRAM), synchronized dynamic random access memory (SDRAM), double data rate 2 (DDR2) RAM, Rambus dynamic random access memory (RDRAM), or other types of memories.

According to an embodiment, the memory 240 may temporarily store software (e.g., a program (program 140 in FIG. 1) and a concurrent processing engine) and input and output data of instructions associated with the software.

According to an embodiment, the programs may include an OS for controlling resources of the electronic device 201, middleware, and applications. The OS may control management (e.g. allocation and deallocation) of one or more system resources (e.g., process, memory, and power). The middleware may provide various functions in order for the application to use functions and information provided in association with the one or more system resources of the electronic device 201.

Figure 3A:
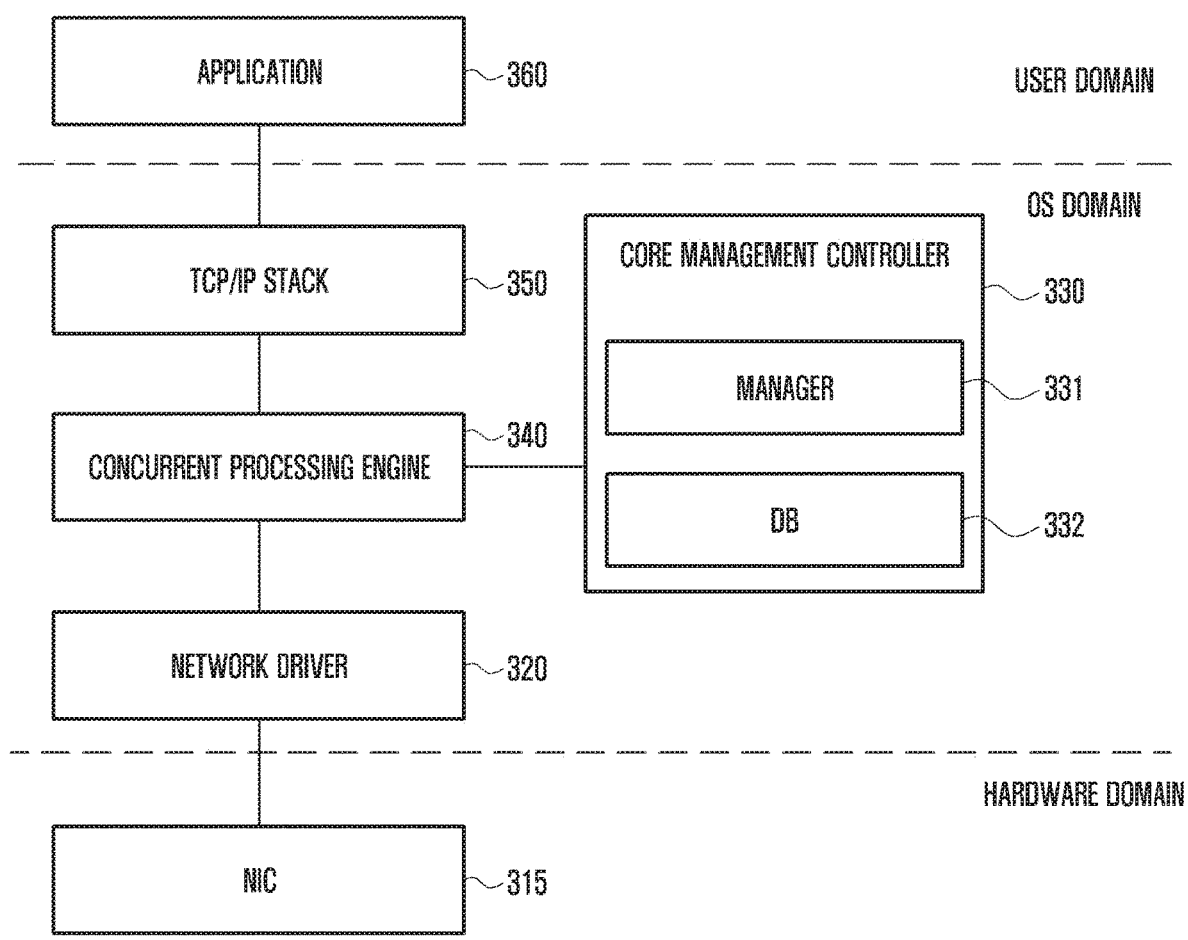
FIGS. 3A and 3B are diagrams of a network packet processing operation according to various embodiments of the disclosure.
Figure 3B:
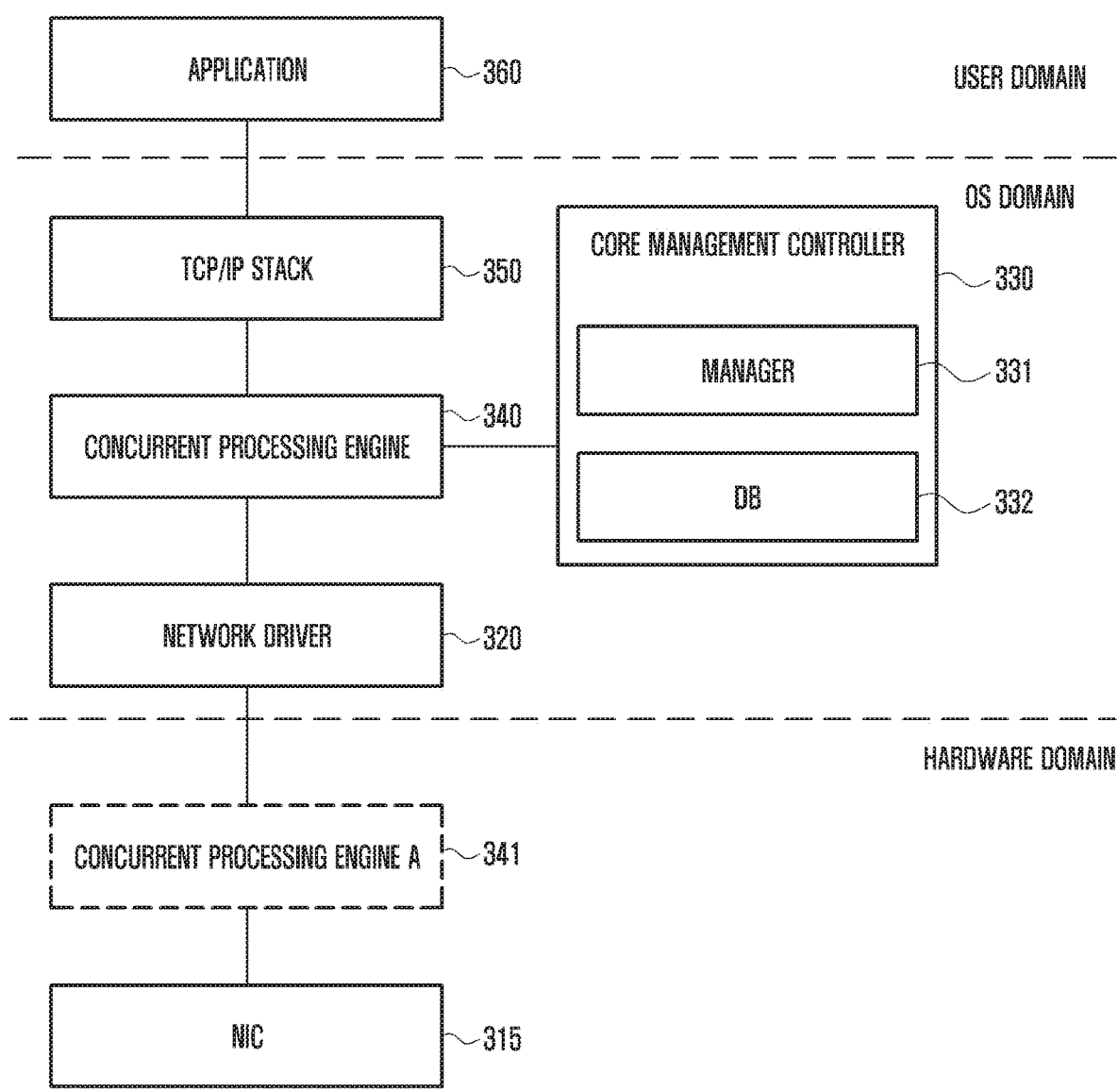
Figure 4:
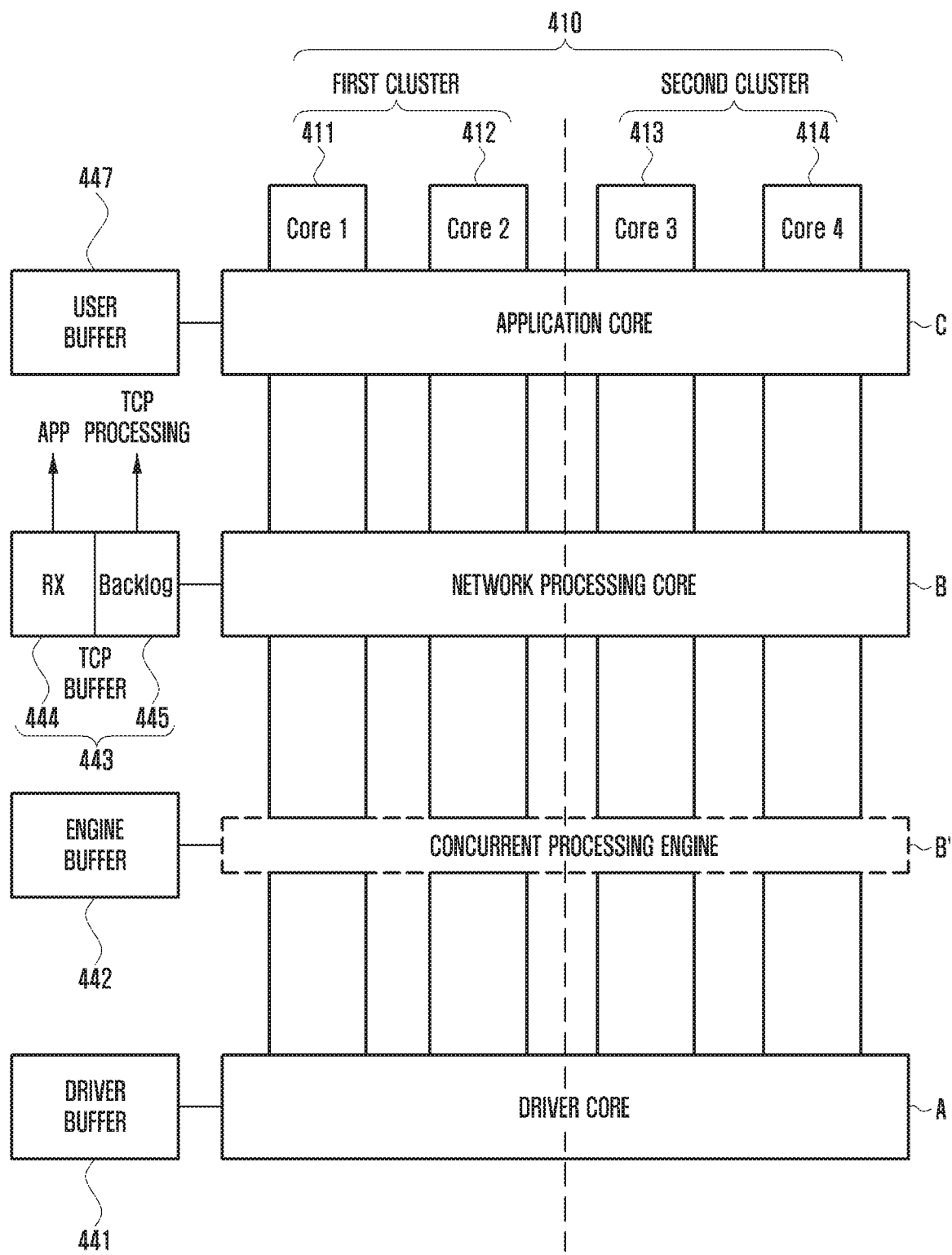
FIG. 4 is a diagram of network packet processing hosts according to an embodiment of the disclosure.

FIGS. 3A and 3B are diagrams of a network packet processing operation according to various embodiments of the disclosure, and FIG. 4 is a diagram of network packet processing hosts according to an embodiment of the disclosure. The electronic devices depicted in FIGS. 3A and 3B may show configurations of a device for receiving packets and processing the received packets.

Referring to FIG. 4, the electronic device (e.g., electronic device 201 in FIG. 2) includes a multicore 410 (e.g., multicore 210 in FIG. 2) and may receive packets via a network driver 320 (e.g., network driver 220 in FIG. 2) and process the received packets in a hardware domain, an OS domain, and a user domain.

Referring to FIG. 3A, the electronic device may include an NIC 315 that is arranged in the hardware domain, a network driver 320, a concurrent processing engine 340, a core management controller 330 (e.g., core management controller 230 in FIG. 2), and a TCP/IP stack 350 that are arranged in an OS domain, and an application 360 arranged in the user domain. Here, the terms "OS domain" and "kernel domain" are used with the same or a similar meaning.

Referring to FIG. 3B, the electronic device may include an MC 315 and a current processing engine A 341 that are arranged in the hardware domain, a network driver 320, a concurrent processing engine 340, a core management controller 330, and a TCP/IP stack 350 that are arranged in the OS region, and an application 360 that is arranged in the user domain.

Referring to FIG. 3B, a concurrent processing engine may be implemented as a hardware component using a plurality of memories. In the embodiment of FIG. 3B, the concurrent processing engine A 341 queues the packets received by the NIC 315 to internal memory buffers (e.g., queues) and activates memory buffer-specific cores (i.e., first core, second core, and so on). The activated cores may control the operation of the network driver and operate the concurrent processing engine 340. In the embodiment of FIG. 3B, it may be understood that there are multiple cores operating the network driver 320. In the following description, the NIC 315, the network driver 320, the concurrent processing engine 340, the core management controller 330, and the TCP/IP stack 350 are presumed to operate in the same manner as described with reference to FIG. 3A. The electronic device may process the received packets in the OS domain (e.g., de-encapsulation) and provide the user with a service as a result of processing the packets in the OS domain. The packets received via the network driver may be processed by the NIC, the network driver 320, the TCP/IP stack 350, and the application 360 in order. The received packets may be processed by the core identified with a different number in each layer.

According to an embodiment, the packets received via the network driver may be processed by the driver core A, the network processing core B, and the application core C in order as shown in FIG. 4. However, the cores are disclosed as software for convenience of explanation, they may be implemented as hardware components (e.g., core 1, core 2, core 3, . . . ) operating in the respective layers. The hosts and operations of the cores for processing packets in respective layers are described later.

According to an embodiment, the network driver 320 may receive network packets via the MC. The network driver 320 may deliver the received packets to the concurrent processing engine 340.

According to an embodiment, the network driver 320 may immediately deliver the received packet to the concurrent processing engine 340.

According to an embodiment, the concurrent processing engine 340 may generate a session ID of the packet received from the network driver 320 for identifying the packet per session. The concurrent processing engine 340 may generate the session ID, based on IP address information (e.g., sender and receiver IP addresses) and port information (e.g., sender and receiver ports), for use in identifying the packet session. The concurrent processing engine 340 may send to the core management controller 330 the session ID of the received packet and a number of the driver core A that has delivered the packet to the concurrent processing engine 340.

According to an embodiment, the concurrent processing engine 340 may receive location information of the location of the core for taking charge of the packet session among the cores in the multicore 410 of the electronic device from the core management controller 330. The location information of the core may be a core number or core cluster information. For example, the core for taking charge of the session may be a core for TCP/IP stack processing, e.g., network processing core B in FIG. 4.

According to an embodiment, the concurrent processing engine 340 may activate the network processing core corresponding to the determined location and send the packet received from the network driver 320 to the TCP/IP stack 350.

According to an embodiment, the TCP/IP stack 350 may perform network layer (e.g., IP layer) and transport layer (e.g., TCP layer and user datagram protocol (UDP) layer) processing on the packet. For example, the TCP/IP stack 350 may perform IP and TCP processing on the received packet and send the TCP-processed packet to the user buffer 447 or the application core C.

According to an embodiment, the core management controller 330 may include a manager 331 and a database (DB) 332.

The core management controller 330 may monitor the packet processing status in the OS domain and the operation status of the application based on the manager 331 and the DB 332 and determine a location of the network (e.g., TCP/IP stack) processing core B and/or application core C for processing the packet based on the session ID of the received packet from the concurrent processing engine 340 and a core determination policy. For example, the core management controller 330 may determine the identifier of the network processing core B and/or application core C or the type of the cluster to which the application core C belongs.

According to an embodiment, the manager 331 of the core management controller 330 may receive a session ID of the received packet from the concurrent processing engine 340. The manager 331 may monitor the information related to the corresponding session ID. For example, the manager 331 may monitor session packet throughput for each application, the location of the driver core A of which the network driver 320 has delivered the packet of the corresponding session to the concurrent processing engine 340, and the location of the application core C delivering the packet of the corresponding session from the TCP/IP stack 350 to the application 360. For example, the manager 331 may check the number or cluster information of the application core C that delivers the packet of the corresponding session from an agent (not shown) included in the TCP/IP stack 350 to the application 360.

According to an embodiment, the manager 331 may store the monitored information (e.g., packet processing amount and core location) in the DB 332.

According to an embodiment, the manager 331 may determine the location of the network processing core B (and/or application processing core C) for processing the packet of the corresponding session based on the monitored information, the location of the application core C, the location of the driver core A, and the packet processing amount of the corresponding session.

According to an embodiment, the manager 331 may determine the location of the network processing core B and/or the application core C. For example, the concurrent processing engine 340 may select one of the cores belonging to the high performance cluster and assign the selected core as the network processing core B based on the location information received form the manager 331, the location information indicating the high performance cluster.

According to an embodiment, the DB 332 may store information on the session monitored by the manager 331, predefined core determination policy information, session information, core information, and application information. For example, the DB 332 may be implemented in the form of, but is not limited to, a table for convenience of explanation.

Table 1 is a table storing core information. The core information may include cluster types corresponding to respective core numbers and core maximum clock information. The manager 331 may check the core information for the location, i.e., cluster type, of the corresponding core.

TABLE 1

| Core number | Cluster type | Maximum clock |
|---|---|---|
| 0 | LITTLE | 1.7 GHz |
| 1 | LITTLE | 1.7 GHz |
| ... | ... | ... |
| 8 | BIG | 2.7 GHz |

Table 2 is a table storing session information for each application. The session information may include throughputs of sessions identified by the session IDs, Rx data sizes, driver core numbers or identifiers, Rx data sizes, application core numbers or identifiers, application identity (ID) information, and threshold processing amount range information. The processing amount of a session denotes a number of packets processed during a predetermined period. For example, if 10 megabytes (MB) of packets are processed per second during a session, the processing amount of the session may be 10 MB per second (MBps).

According to an embodiment, the session information may include driver core A number, application core B number, and network processing core C number corresponding to a combination of the application core C number and threshold processing amount range of the core.

TABLE 2

| Session ID | Driver core | Application core | Rx data size | Processing amount | Network processing core | Application ID |
|---|---|---|---|---|---|---|
| 0 | 0 | 3 | 10 Mb | 10 Mbps | 2 | 1 |
| 1 | 0 | 5 | 150 Mb | 150 Mbps | 7 | 2 |
| ... | ... | ... | ... | ... | ... | ... |
| N | [0, M] | [0, M] | Number | Number | [0, M] | K |

Table 3 is a table storing operation FLAG values corresponding to predetermined application IDs. The FLAG values may be the information indicating predetermined applications.

TABLE 3

| Application ID | FLAG |
|---|---|
| 0 | 0 |
| 1 | 1 |
| ... | ... |
| K | Number |

Table 4 is a table of core determination policies. The manager 331 may determine a location of a network processing core B based on the location of the driver core A, the location of the application core C, and processing amount information of a session. For example, in the case where the driver core A belongs to the low performance type, the application core C belongs to the high performance type, and the packet processing amount is high, the manager 331 may determine that the network stack processing core B belongs to the high performance type. The manager 331 may also determine the location of the network processing core B such that a core that has a predetermined number or is randomly selected among the cores belonging to the high performance type performs network stack processing.

TABLE 4

| Driver core | Application core | Low throughput | medium throughput | Heavy throughput | Core of pre-determined application |
|---|---|---|---|---|---|
| LITTLE | LITTLE | — | LITTLE | BIG | LITTLE |
| LITTLE | BIG | — | BIG | BIG | |
| BIG | LITTLE | — | BIG | BIG | |
| BIG | BIG | — | BIG | BIG | |
| | BIG | BIGBIG | | | |

Hereinafter, a description is made of the host and operations of a core processing packets in the OS domain. Referring to FIG. 4, the multicore 410 may include, but is not limited to, core 1 411, core 2 412, core 3 413, and core 4 414. The cores included in the multicore 410 may be categorized, according to their performances, into one of a low performance cluster or a high performance cluster. For example, core 1 411 and core 2 412 may belong to the low performance cluster and characterized by less power consumption and low processing capability, However, core 3 413 and core 4 414 may belong to the high performance cluster and characterized by more power consumption and high processing capability.

The driver core A may deliver packets from the network driver 320 to the concurrent processing engine 340. For example, the driver core A may queue the packet delivered to the network driver 320 in the engine buffer 442 of the concurrent processing engine 340. The driver core A may control the concurrent processing engine 340.

According to an embodiment, the concurrent processing engine 340 may determine one of the cores of the multicore 410 as the network processing core B based on the core assignment information received from the core management controller 330. The concurrent processing engine 340 may activate the core identified by the number of the determined network processing core B and queue the packet in the engine buffer 442 corresponding to the determined network processing core B.

The network processing core B may process packets in the TCP/IP stack 350. The application core C may process TCP-processed packets in a TCP buffer in the user domain.

According to an embodiment, the packet received via the network driver 320 may be sequentially processed by the driver core A, the network processing core B, and the application core C in order. The packet may be processed by the core identified with a different number in each layer. For example, core 0 may be designated as the driver core A and core 3 may be designated as the network core B, in the packet processing procedure.

The cores A, B, and C of the respective layers may be assigned buffers for processing packets. For example, the driver core A may be assigned the driver buffer 441 for queuing packets and delivering the packets to the concurrent processing engine 340. The concurrent processing engine 340 may be assigned the engine buffer 442 for temporarily queuing the packets to be delivered to the network processing core B. The network processing core B may be assigned the TCP buffer 443 for TCP/IP processing. The TCP buffer 443 may be assigned per session, but it is not limited thereto. The application core C may be assigned the user buffer 447 for data processing of an application. Although FIG. 4 depicts a single buffer per layer for convenience of explanation, there may be multiple buffers per layer. Each buffer may be implemented in the form of, but is not limited to, a stack-structured memory or queue. Each buffer may be a part of the memory (e.g., memory 130 in FIG. 1) of the electronic device 201 (e.g., electronic device 101 in FIG. 1).

According to an embodiment, the network driver 320 may send the packet received from the MC to the engine buffer 442 of the concurrent processing engine 340 under the control of an arbitrary driver core A.

For example, if a packet arrives at the network driver, a core having a certain number, e.g., core 1 411, is activated as the driver core A, which may control the operation of the concurrent processing engine 340 and queue the received packet in the engine buffer 442 of the concurrent processing engine 340.

The concurrent processing engine 340 may generate a session ID of the packet and send session ID information and location information of the driver core A from which the packet has been received to the core management controller 330.

The core management controller 330 may determine a location of the application core C for processing the application 360 in the user domain in association with the session ID of the received packets and provide the concurrent processing engine 340 with the location information of the application core C. For example, the core management controller 330 may determine the location of the network processing core B for TCP/IP stack processing based on the location of the application core C, the location of the driver core A, and a session packet processing amount.

The concurrent processing engine 340 may activate the network processing core B corresponding to the location determined based on the location information received from the core management controller 330. The concurrent processing engine 340 may reflect varying pieces of location information of the application core C based on the location information received from the core management controller 330 and assign the network processing core B in order for a core having a capability equal to or higher than that of the application core C to process the packets.

The network processing core B may perform TCP stack processing on the packets queued in the TCP buffer 443. For example, if core 3 413 is activated by the concurrent processing engine 340, the network processing core B indexed by core 3 sends the packets queued in the engine buffer 442 to the TCP buffer 443 and performs TCP/IP stack processing on the packets queued in the TCP buffer 443.

The application core C may process the packets TCP/IP-processed by the network processing core B based on the session ID of the packets.

According to an embodiment, the TCP buffer 443 may be assigned to at least one region. For example, the TCP buffer 443 may be included in an Rx queue region 444 for queuing the packets to be delivered to or read by the application, i.e., TCP-processed packets, and a backlog region 445 to which the packets on which the TCP/IP stack processing is to be performed are delivered. The Rx queue region 444 may store the packets TCP/IP-processed by the network processing core B.

According to an embodiment, the network processing core B may queue the packets in the backlog region 445 for TCP/IP stack processing while the application 360 outputs the packets from the Rx queue region 444 to the user domain.

According to an embodiment, the application associated with the session ID of the packets may batch all the packets queued in the backlog region 445 while the application core C processes all the TCP-processed packets queued in the Rx queue region 444.

According to various embodiments, the proposed electronic device is capable of optimally batching the packets processed in a lower layer and delivering the optimally batched packets to a higher layer by determining to allow a core having a capability equal to or greater than that operating in the higher layer to operate in the low layer, thereby improving the multicore performance.

Figure 5:
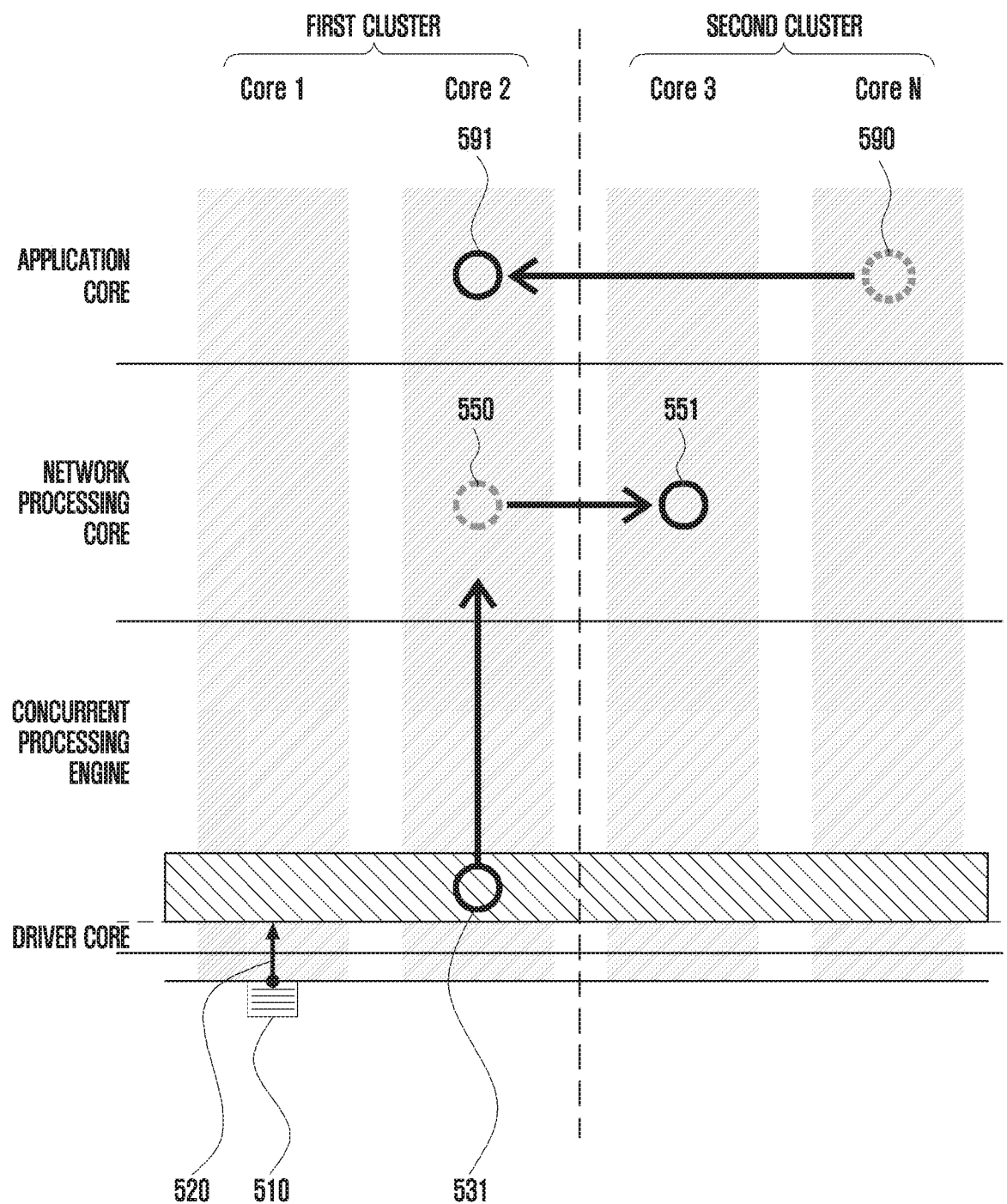
FIG. 5 is a diagram illustrating a packet processing operation of an electronic device according to an embodiment of the disclosure.

FIG. 5 is a diagram illustrating a packet processing operation according to an embodiment of the disclosure.

In a receive packet steering (RPS)-based technology of the related art, if packets are received from a network driver, a network processing core is arbitrarily selected among multiple cores without any priority order to perform TCP/IP processing. In a receive flow steering (RFS)-based technology, a network processing core having a core number (core N) on which an application 590 is running is selected to perform TCP/IP processing. According to the technologies of the related art, the network processing core is selected without consideration of a processing capacity of the core and a location of the core executing the application, which causes a performance difference between the application core and the driver core, leading to a failure to take full advantage of the multicore processing performance. Furthermore, if packets are concentrated in a certain session, this may overload a core, resulting in packet processing performance degradation.

Referring to FIG. 5, the electronic device (e.g., electronic device 101 in FIG. 1 and electronic device 201 in FIG. 2) including the multicore (e.g., multicore 210 in FIG. 2 and multicore 410 in FIG. 4) may determine a location of an application core based on a session ID of the packets and a location (e.g., number or cluster type) of a network processing core for TCP/IP stack processing based on a location of a driver core and a packet processing amount of a session. According to various embodiments, the network processing core determined in consideration of the performances of the cores of a lower layer and a higher layer performs network stack processing on the packets, which improves multicore-based batch processing performance.

According to an embodiment, if a packet 510 arrives at the network driver, a driver core of core 1 may be activated. The application associated with the packet may process the packets TCP/IP stack-processed by the application core of core N. The driver core of core 1 may send the packets to a concurrent processing engine (e.g., concurrent processing engine 340 in FIGS. 3A and 3B) as denoted by reference number 520. Then, the concurrent processing engine may assign a network processing core for performing TCP/IP stack processing to core 2 based on the location information received from a core management controller. The location of the network processing core may be determined in consideration of the location (core 2) of the application core, the location (core 1) of the driver core, and a processing amount of the packet session.

If the driver core of core 1 activates the network processing core of core 2, the concurrent processing engine may send the packets to the TCP buffer (e.g., TCP buffer 443 in FIG. 4). The network processing core may perform TCP/IP stack processing on the packets queued in the TCP buffer. The application may output the packets TCP/IP stack-processed by the application core of core N.

According to an embodiment, the location of the application may move from core N to core 2 according to the operation status of the electronic device. For example, the location 590 of the application core executing the application in the user domain may be dynamically changed according to the application execution location (e.g., foreground and background) and a core load value.

If the location of the application core is changed from the location 590 to the location 591, the concurrent processing engine may change the location of the network processing core from a core 2 location 550 to a core 3 location 551. The concurrent processing engine may send the packets at location 531 to the TCP buffer in core 3. The network processing core of core 3 may perform TCP/IP stack processing on the packets. The application core of core 2 may process the packets processed by the network processing core of core 3.

According to an embodiment, the electronic device including the multicore may determine a network stack processing core in consideration of the location of the application core or the location of the driver core.

Figure 6:
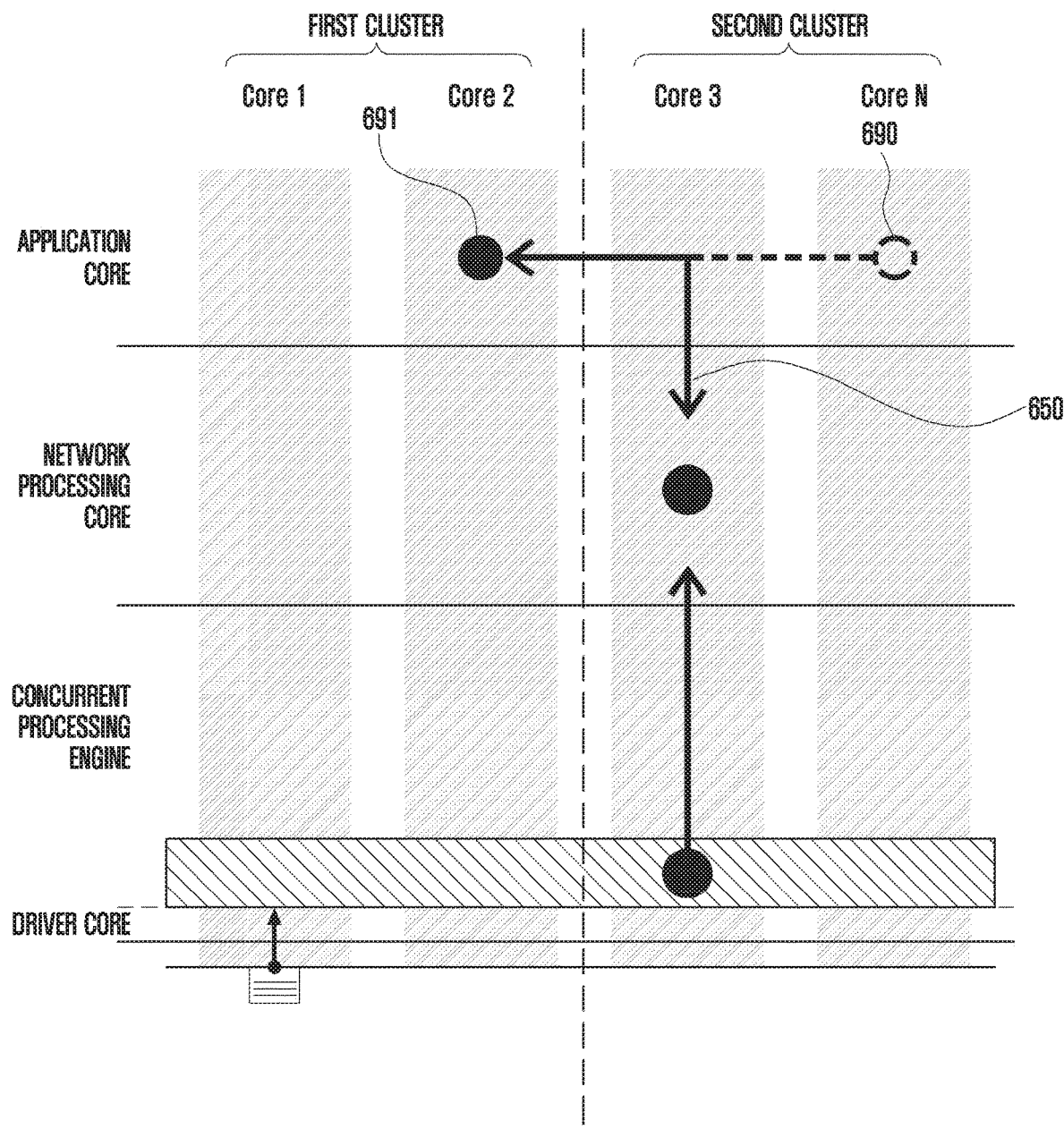
FIG. 6 is a diagram illustrating a packet processing operation of an electronic device according to an embodiment of the disclosure.

FIG. 6 is a diagram illustrating a packet processing operation of an electronic device according to an embodiment of the disclosure.

Referring to FIG. 6, the electronic device (e.g., electronic device 101 in FIG. 1 and electronic device 201 in FIG. 2) including the multicore (e.g., multicore 210 in FIG. 2 and multicore 410 in FIG. 4) may determine the number (or cluster type) of the application core as well as the network processing core for TCP/IP stack processing to change the location of the application core for processing the packets.

For example, the electronic device may determine the location 650 of core 3 as the network processing core for TCP/IP stack processing in consideration of the location of the application core, the location of the driver core, and a processing amount of each session. The driver core may control the concurrent processing engine to queue the packets in the TCP buffer. The network processing core of core 3 may perform TCP/IP stack processing on the packets queued in the TCP buffer (e.g., TCP buffer 443 in FIG. 4).

For example, the application core, which reads out and processes the TCP/IP stack-processed packets, may move its location from a core N location 690 to a core 2 location 691. In FIG. 6, the application operating in the application core of core N may be an application predetermined by the application core number (e.g., cluster type). The electronic device may change the location 690 of the application core when the session processing amount of received packets becomes equal to or greater than a predetermined level. For example, if the session processing amount of the received packets reaches a middle or high level, the electronic device may change the location of the application core from core N location 690 to core 2 location 691 by reflecting the location of the predetermined core. If the session processing amount of the received packets is a low level, the electronic device may maintain the location 690 of the application core. In the case whether the location of the application core is changed from the core N location 690 to the core 2 location 691, the application core of core 2 may read out and process the TCP/IP stack-processed packets.

Figure 7:
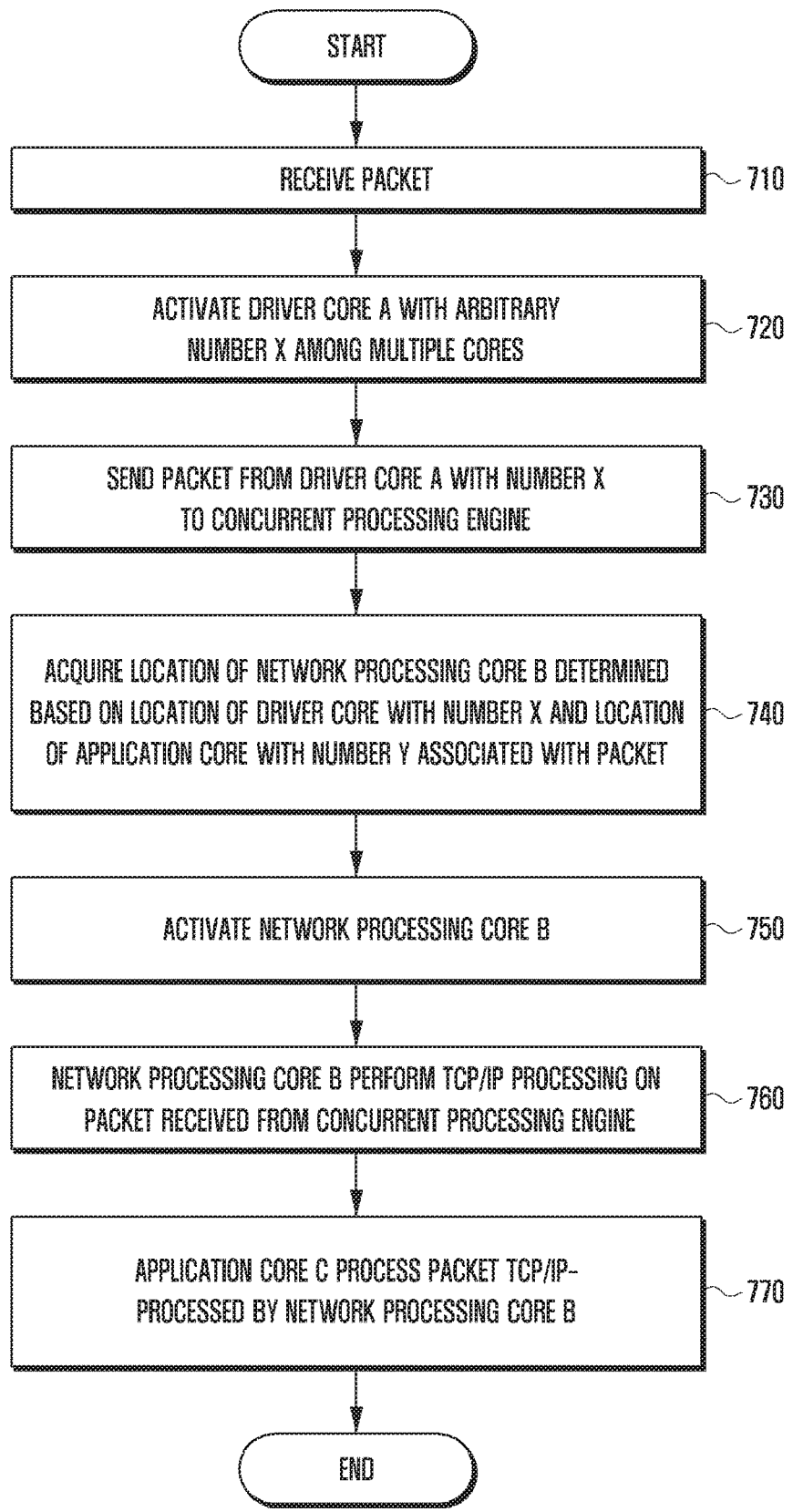
FIG. 7 is a flowchart illustrating a method to determine a core for processing packets according to an embodiment of the disclosure.

FIG. 7 is a flowchart illustrating a method to determine a core for processing packets according to an embodiment of the disclosure.

Referring to FIG. 7, operations 710 to 770 may be performed by the electronic device (e.g., electronic device 101 in FIG. 1 and electronic device 201 in FIG. 2) include the multicore (e.g., multicore 210 in FIG. 2 and multicore 410 in FIG. 4).

According to an embodiment, the electronic device 101 may receive at least one packet via an NIC (e.g., NIC 315 in FIGS. 3A and 3B) at operation 710.

At operation 720, the electronic device may activate a driver core A with an arbitrary number X among multiple cores of the multicore based on the received packet.

According to an embodiment, the core may be activated under the control of a communication processor. The core may be a core with a predetermined default number or a core that is randomly selected. The core may be a core selected among the cores in the sleep mode.

At operation 730, the driver core A with number X in the electronic device may queue the received packet in an engine buffer (e.g., engine buffer 442 in FIG. 4) of a concurrent processing engine (e.g., concurrent processing engine 340 in FIGS. 3A and 3B, concurrent processing engine 540 in FIG. 5, and concurrent processing engine 640 in FIG. 6).

According to an embodiment, the concurrent processing engine may generate a session ID of the received packets and send the session ID of the packets and the number information of the driver core A that has transmitted the packets to the concurrent processing engine to a core management controller (e.g., core management controller 230 in FIG. 2 and core management controller 330 in FIGS. 3A and 3B). The core management controller may determine a location (e.g., number or cluster type) of the network core B in consideration of the location (e.g., number X) of the driver core A, the location (e.g., number Y) of the application core C associated with the packets, and the packet processing amount.

At operation 740, the driver core A of the electronic device may receive location information of the network processing core from the core management controller.

At operation 750, the driver core A may activate the network processing core B corresponding to the location acquired from the location information. The network processing core B may send the packets stored in the concurrent processing engine to the TCP buffer.

According to an embodiment, if the location of the network processing core is indicative of the cluster type, the driver core A of the electronic device may activate one of the cores belonging to the corresponding cluster type.

At operation 760, the network processing core B of the electronic device may perform TCP/IP processing on the packets.

At operation 770, the application core C of the electronic device may processes the packets TCP/IP-processed by the network processing core B. The application core C may be a core for operating the application associated with the session ID of the received packets.

According to an embodiment, operations 760 and 770 may either be performed simultaneously or in parallel. For example, the TCP buffer assigned to the TCP/IP stack may include an Rx buffer for queuing the TCP/IP-processed packets and a backlog buffer for queueing the packets before being processed. The application core C may process the packets queued in the Rx buffer and, simultaneously or in parallel, the network processing core B may perform TCP/IP stack processing on the packets queued in the backlog buffer.

According to various embodiments, the electronic device (e.g., electronic device 101 in FIG. 1 and electronic device 201 in FIG. 2) may include a communication device (e.g., communication module 190 in FIG. 1), a multicore (e.g., multicore 210 in FIG. 2) comprised of multiple cores operating in at least one of a driver core A layer, a network processing core B layer, and an application core C layer for processing packets and a memory (e.g., memory 130 in FIG. 1 and memory 240 in FIG. 2) storing instructions, executable by at least one of the multiple cores, for checking a location of the driver core delivering packets received by the communication device to an OS domain, a location of the application core for processing the packets in a user domain, and a processing amount of a session corresponding to the received packets, determining a location of the network processing core among the cores based on at least one of the locations of the driver core and the application core and the processing amount of the session, and performing, at the located network processing core, network stack processing on the packets delivered to the OS domain.

According to an embodiment, the location of the network processing core is a core number or cluster information of a core type categorized according to a capability difference, the location of the network processing core may be core number or cluster type cluster information classified according to a performance difference.

According to an embodiment, the instructions cause one core of the multicore to determine the location of the network processing core by selecting a core number to control network processing core layer.

According to an embodiment, the multiple cores are categorized into one of a first cluster type and a second cluster type, and the instructions cause the at one of the multicore to determine a cluster type of the network processing core and determine the location of the network processing core by randomly selecting a core number belonging to the determined cluster type to determine the location of the network processing core.

According to an embodiment, the instructions cause the core of the multicore to: activate a driver core with an arbitrary core number X among the multiple cores, send the packets through the driver core with the core number X to the operating system domain, acquire, at the driver core with the core number X, the determined location of the network processing core, send the packets through the driver core with the core number X to the network processing core with a core number Z based on the acquired location of the network processing core, perform, at the network processing core with the core number Z, network stack processing on the received packets, and process, at the application core with an arbitrary core number Y, the packets processed by the network processing core with the core number Z.

According to an embodiment, the instructions cause the core of the multicore to: process by batching the packets corresponding in amount to a predetermined reference processing amount configured by the network processing core.

According to an embodiment, the electronic device comprising a concurrent processing engine and a core management controller operating in the operating system domain, wherein the instructions cause the at concurrent processing engine to: generate session identity information of the packets from the driver core, send the session identity information and a core number of the driver core that sends the packets to the concurrent processing engine to the core management controller, acquire the location of the network processing core from the core management controller, and send the packets received from the driver core to the network processing core at the determined location.

According to an embodiment, the instructions cause the core management controller to: determine a core number of the network processing core based on at least one of the session identity information of the received packets, the core number of the driver core, the core number of the application core processing the packets, and packet processing amount information of the session and send the core number of the network processing core to the concurrent processing engine.

According to an embodiment, the instructions cause the at one of the multicore to: determine the location of the application core by monitoring operations of the application processing the packets based on the session identity information of the packets and change the location of the application core processing the packets among the cores based on a condition of changing the location of the application core being satisfied, determining, based on a determination that the location of the core corresponding to the application associated with the packets is not designated, the location of the application core according to whether the application is running in foreground or background. According to an embodiment, the instructions cause the at one of the multicore to perform at least one of: for identifying the location of the application core, based on a determination that a location of a core for an application associated with the packets is designated, with the designated location of the core, determining, based on a determination that the location of the core corresponding to the application associated with the packets is not designated, the location of the application core according to whether the application is running in foreground or background, and determining the location of the application core through learning related to packet processing of the application.

Figure 8:
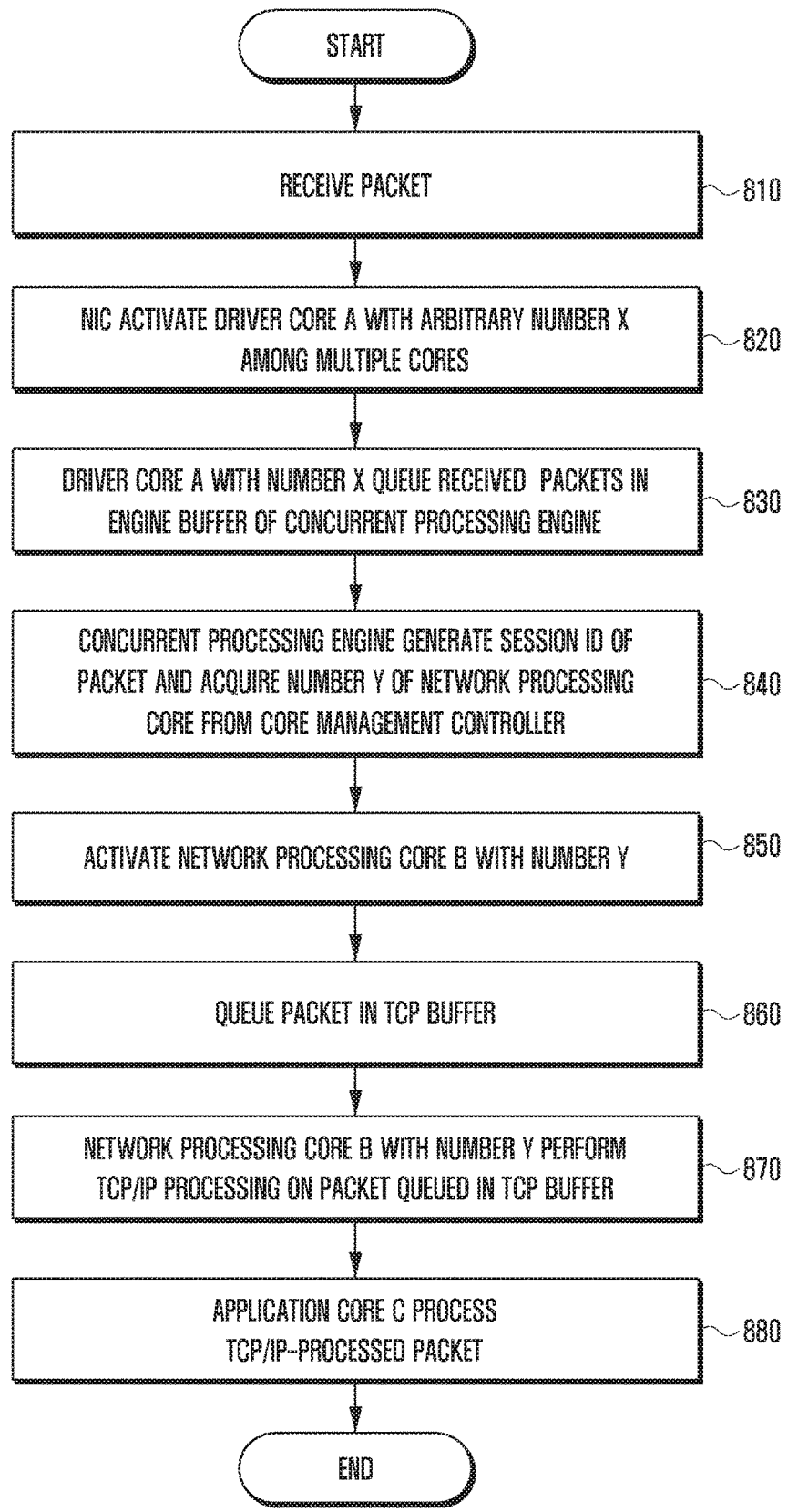
FIG. 8 is a flowchart illustrating a method to determine a core for processing packets according to an embodiment of the disclosure.

FIG. 8 is a flowchart illustrating a method to determine a core for processing packets according to an embodiment of the disclosure.

Referring to FIG. 8, the electronic device (e.g., electronic device 101 in FIG. 1 and electronic device 201 in FIG. 2) including a multicore (e.g., multicore 210 in FIG. 2) may receive packets at operation 810 by means of an NIC (e.g., NIC 315 in FIGS. 3A and 3B).

At operation 820, the electronic device may activate a driver core A identified by number X among multiple cores of the multicore upon receipt of the packets.

At operation 830, the driver core A identified by number X in the electronic device may queue the received packets in an engine buffer (e.g., engine buffer 442 in FIG. 4) of a concurrent processing engine (e.g., concurrent processing engine 340 in FIGS. 3A and 3B).

At operation 840, the concurrent processing engine generates a session ID of the packets and receives number Y of the network processing core B from a core management controller (e.g., core management controller 230 in FIG. 2 and core management controller 330 in FIGS. 3A and 3B). For example, operation 840 may be performed through operations 910 to 960 of FIG. 9 for acquiring location information (e.g., number Y) of the network processing core B.

According to an embodiment, the concurrent processing engine may check for the session ID of the received packets, send number X of the driver core A that has delivered the packets to the concurrent processing engine to the core management controller, and receive number Y of the network processing core B from the core management controller.

According to an embodiment, the core management controller may determine the number of the network processing core B for performing TCP/IP stack processing in consideration of the location of the application core associated with the session ID of the packets, the location of the driver core, and the per-session processing amount.

According to an embodiment, the core management controller may send the number information of the network processing core B to the concurrent processing engine. The concurrent processing engine may assign the network processing core B identified by the corresponding number for processing the received packets.

At operation 850, the driver core A may activate the network processing core B identified by number Y.

At operation 860, the network processing core B identified by number Y may output the packets from the engine buffer and queue the packets in the TCP buffer.

At operation 870, the network processing core B identified by number Y may perform TCP/IP processing on the packets queued in the TCP buffer.

At operation 880, the application core C may process the TCP/IP-processed packets.

Figure 9:
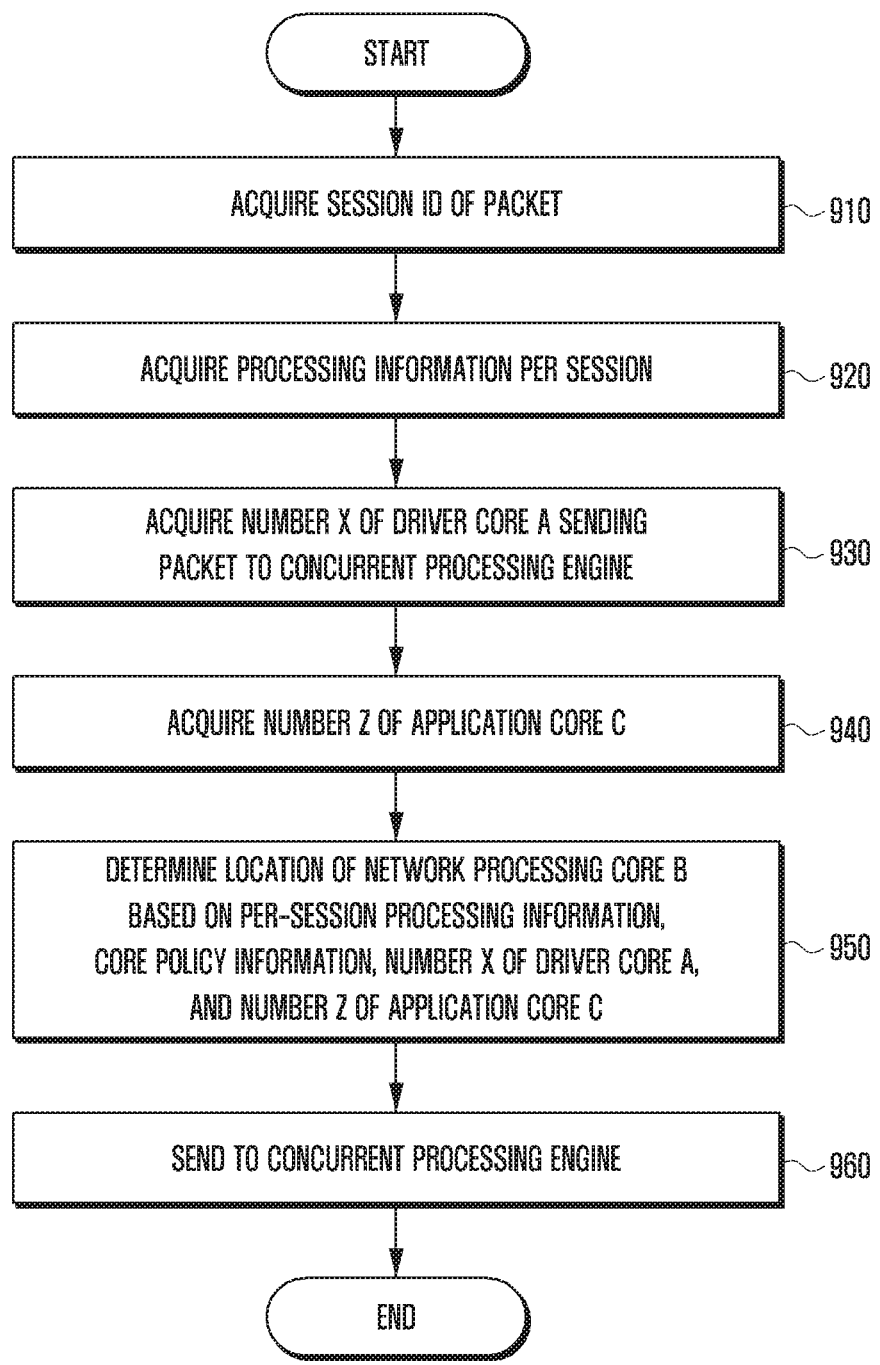
FIG. 9 is a flowchart illustrating a method to determine a core for processing packets according to an embodiment of the disclosure.
Figure 10:
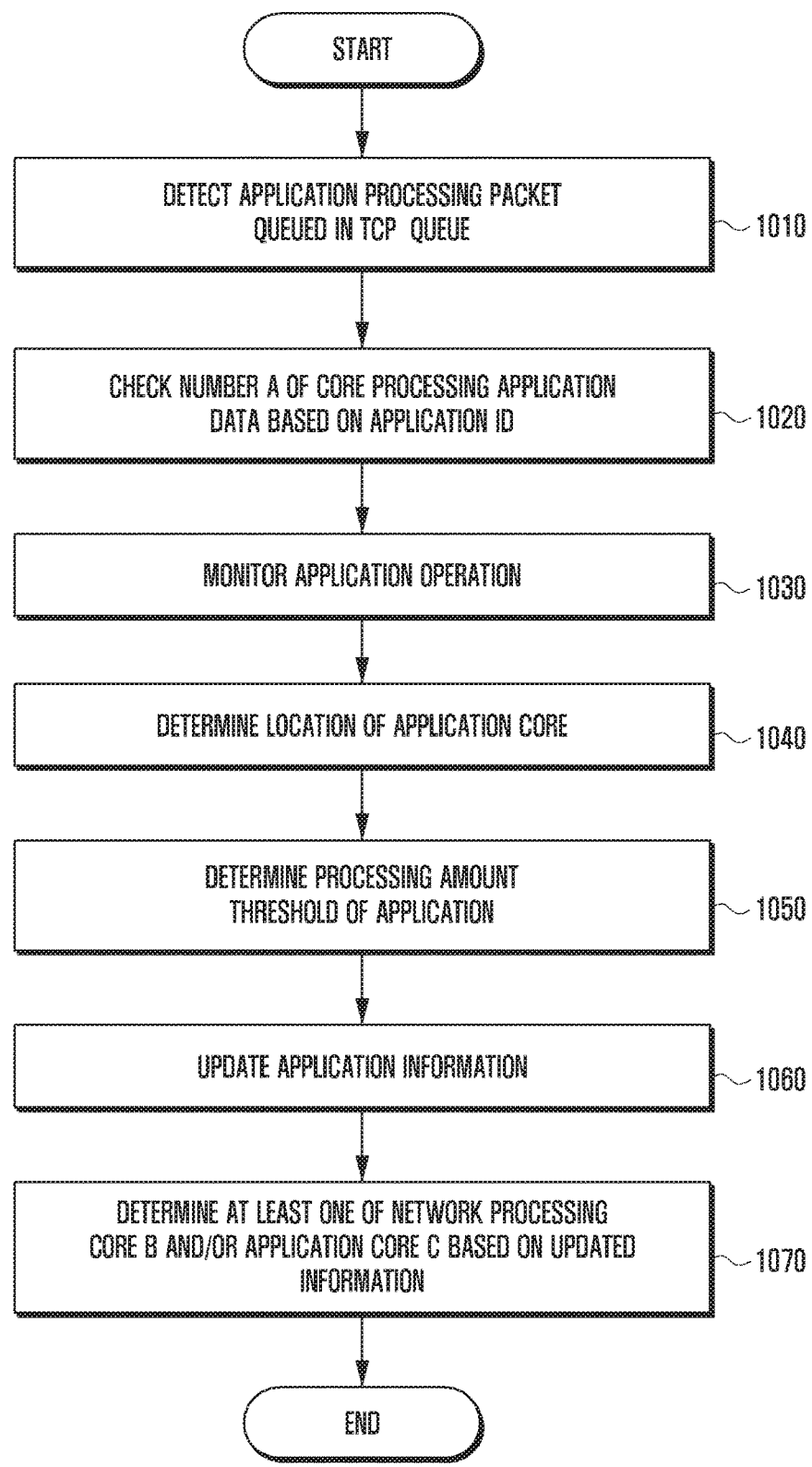
FIG. 10 is a flowchart illustrating a method to determine a core for processing packets according to an embodiment of the disclosure.

Although it is described that the electronic device controls the operations of FIGS. 9 and 10, it may be understood that the core management controller depicted in FIGS. 3A and 3B or a processor controlling the multicore controls the operations.

FIG. 9 is a flowchart illustrating a method for a multicore electronic device to determine a core for processing packets according to an embodiment of the disclosure.

Referring to FIG. 9, the electronic device (e.g., electronic device 101 in FIG. 1 and electronic device 201 in FIG. 2) including a multicore (e.g., multicore 210 in FIG. 2 and multicore 410 in FIG. 4) may determine a location of the network processing core B for performing network stack (e.g. TCP/IP stack) processing on the packets. Although it is described that the electronic device controls operations 910 to 960, it may be understood that a core management controller (e.g., core management controller 230 in FIG. 2 and core management controller 330 in FIGS. 3A and 3B) or a processor (e.g., processor 120 in FIG. 1) controlling the multicore may control the operations.

At operation 910, the electronic device may receive a session ID of the packets from a concurrent processing engine (e.g., concurrent processing engine 340 in FIGS. 3A and 3B, concurrent processing engine 540 in FIG. 5, and concurrent processing engine 640 in FIG. 6). At operation 920 the electronic device may acquire session processing information for each application session. At operation 930, the electronic device may acquire location information (e.g., a core number) of a driver core that has sent the packets to the concurrent processing engine. At operation 940, the electronic device may acquire location information (e.g., core number or cluster type) of an application core C for processing the packets associated with the session ID.

At operation 950, the electronic device may determine location Y of a network processing core B based on session processing information, core policy information, location X of the driver core A, and location Z of the application core C. At operation 960, the electronic device may send the information on number Y of the network processing core B to the concurrent processing engine.

FIG. 10 is a flowchart illustrating a method for a multicore electronic device to determine a core for processing packets according to an embodiment of the disclosure.

Referring to FIG. 10, the electronic device (e.g., electronic device 101 in FIG. 1 and electronic device 201 in FIG. 2) including a multicore (e.g., multicore 210 in FIG. 2 and multicore 410 in FIG. 4) may monitor the location of the application core processing data in the user domain for a change and determine a location of a network processing core B based on the changed location of the application core.

At operation 1010, the electronic device may detect application processing packets queued in a TCP buffer in the user domain.

At operation 1020, the electronic device may acquire number "a" of an application core C processing application data based on an application ID.

According to an embodiment, the electronic device may acquire location information (e.g., core number or cluster type) of the application core C based on the application ID received from an agent included in a network processing stack (e.g., TCP/IP stack).

At operation 1030, the electronic device may monitor an application operation status.

At operation 1040, the electronic device may determine a location of the application core.

According to an embodiment, the electronic device may check the application operation status for a time of a core processing the application and a number of packets being processed based on the application ID and, if the use of the cores of a predetermined cluster type is greater than an threshold operation value, designate the cluster type of the corresponding core as the location of the main core processing the application.

According to an embodiment, the electronic device may designate the location of the application core based on whether the application is running in the foreground or the background.

According to an embodiment, the electronic device may predesignate a core location for a specific application or designate the location of the application core through machine learning.

At operation 1050, the electronic device may determine a processing amount threshold value of a packet processing amount of the application according to the location of the application core.

According to an embodiment, the electronic device may change the threshold value of the packet processing amount of the application based on the location information of the application core, location information of the driver core delivering the packets to the concurrent processing engine, and characteristic information of the application.

According to an embodiment, the electronic device may change the threshold value of the packet processing amount according to the location of the main core processing the application.

According to an embodiment, the electronic device may change the threshold value of the packet processing amount based on whether the application is running in the foreground or the background.

According to an embodiment, the electronic device may change the threshold value of the packet processing amount based on preconfigured information or, if the location of the application core is designated through learning, the designated location of the core.

At operation 1060, the electronic device may update application information. At operation 1070, the electronic device may determine at least one of the network processing core and/or application core by applying the updated information.

Figure 11:
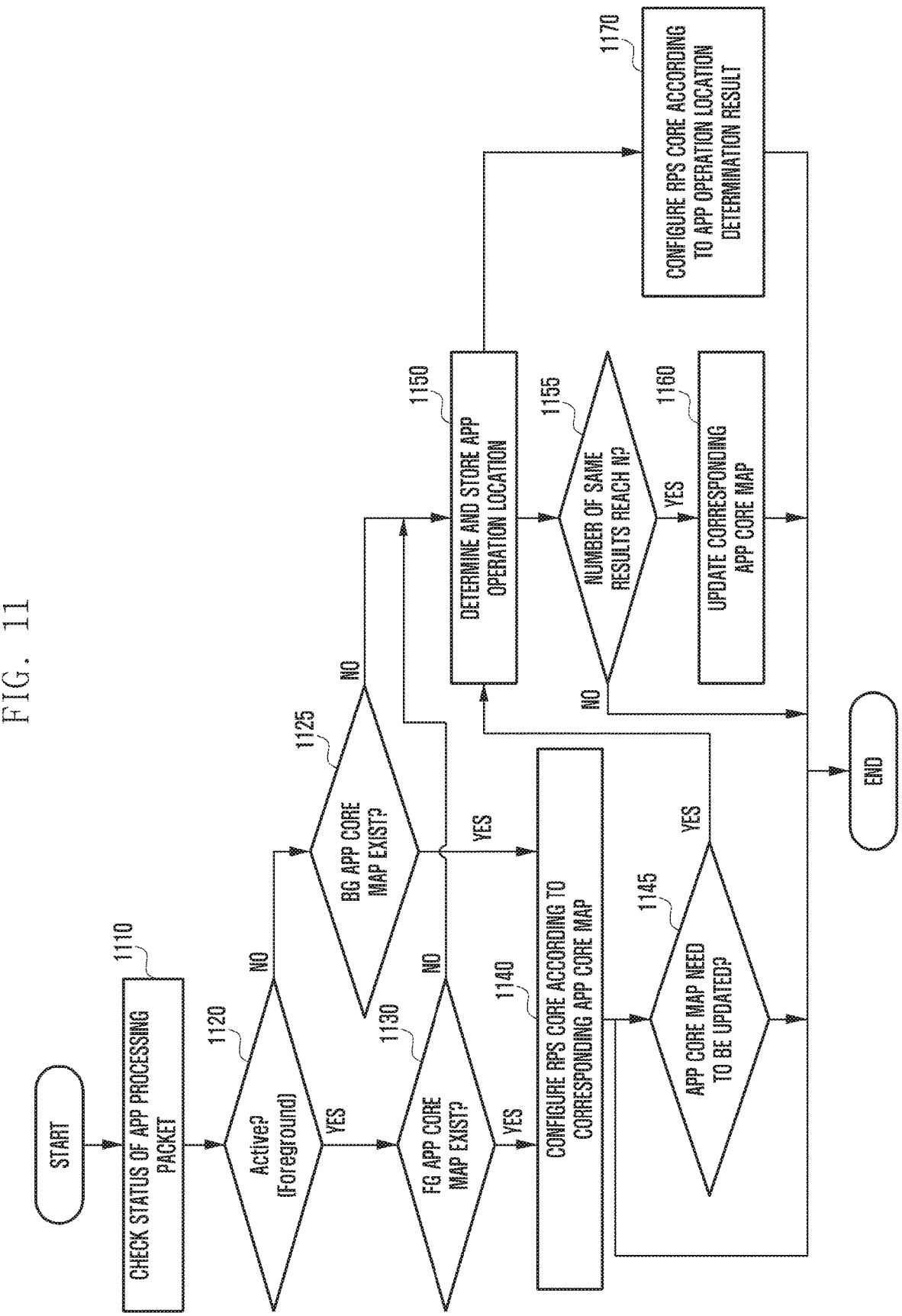
FIG. 11 is a flowchart illustrating a method to determine a core for processing packets according to an embodiment of the disclosure.

FIG. 11 is a flowchart illustrating a method for a multicore electronic device to determine a core for processing packets according to an embodiment of the disclosure.

Referring to FIG. 11, the electronic device (e.g., electronic device 101 in FIG. 1 and electronic device 201 in FIG. 2) including a multicore (e.g., multicore 210 in FIG. 2 and multicore 410 in FIG. 4) may check, at operation 1110, the status of the application (or app) processing the received packets. At operation 1120, the electronic device may determine whether the application is running in the foreground. If it is determined that the application is running in the foreground, the electronic device may determine at operation 1130 whether a core map of the application running in the foreground exists. If it is determined that the application is not running in the foreground, the electronic device may determine at operation 1125 whether a core map of the application running in the background exists. For example, the core map of an application may be information indicating the location of a predesignated core based on the application ID.

If it is determined that a core map of the corresponding application exists at operations 1130 or 1125, the electronic device may designate a cluster type location of an RPS core for TCP/IP stack processing according to the application core map at operation 1140. For example, the RPS core may be a network processing core. If it is determined that a core map of the corresponding application does not exist, the procedure proceeds to operation 1150.

At operation 1145, the electronic device may determine whether the application core may need to be updated. According to an embodiment, if the location of the core designated in the application core map differs from the location of the application core processing data in the user domain, the electronic device may determine that the application core map needs to be updated. According to an embodiment, if a period predetermined for updating the core map elapses, the electronic device may determine that the application core map needs to be updated.

At operation 1150, the electronic device may determine and store the location of the application core for processing data in the user domain. The electronic device may determine at operation 1155 whether the number of times of the same application core location determination result reaches N and, if so, the core may update the core map of the corresponding application at operation 1160. At operation 1170, the electronic device may configure the RPS core for TCP/IP stack processing in consideration of the location information of the application core determined based on the application core location determination result.

Figure 12:
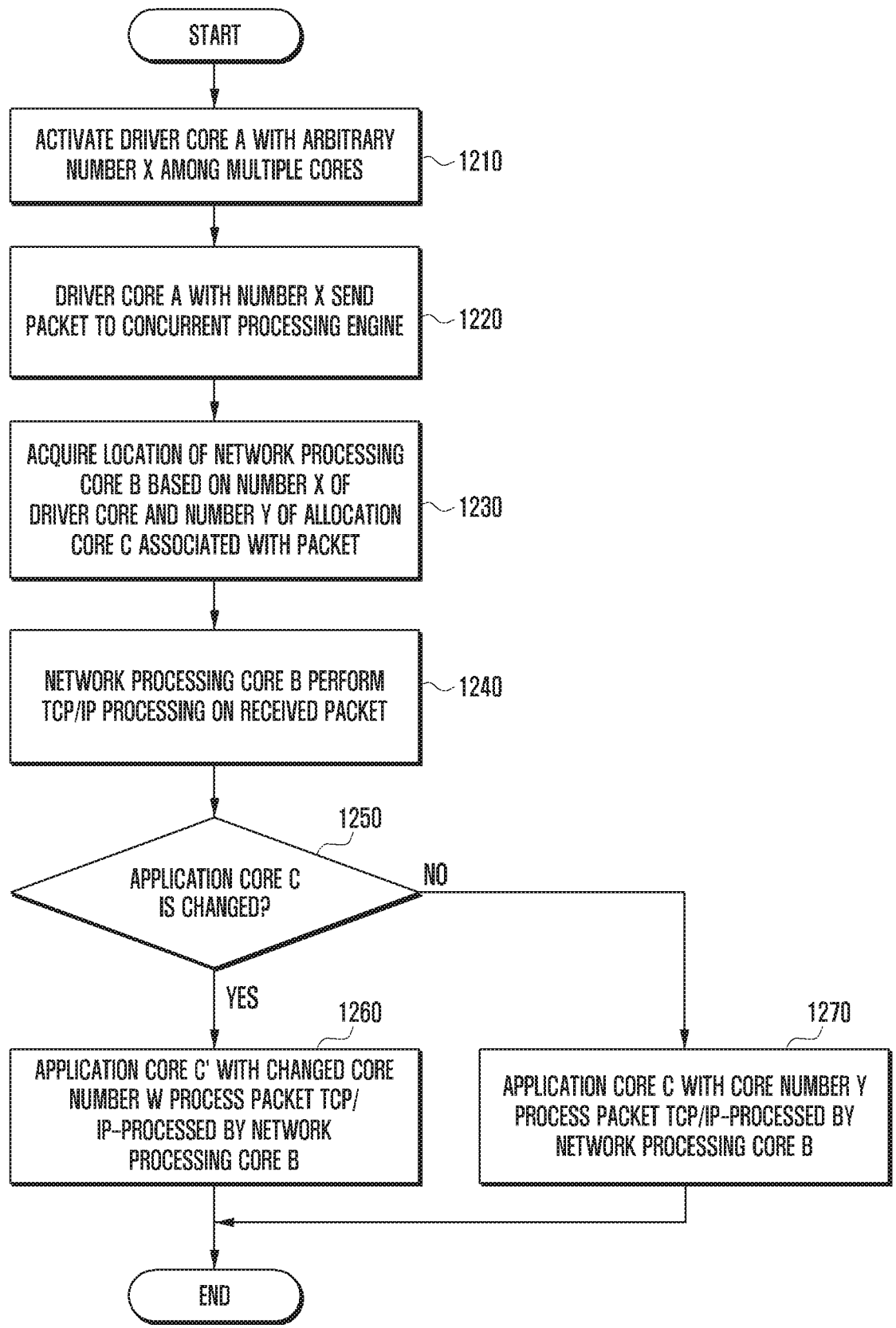
FIG. 12 is a flowchart illustrating a method to determine a core for processing packets according to an embodiment of the disclosure.

FIG. 12 is a flowchart illustrating a method for a multicore electronic device to determine a core for processing packets according to an embodiment of the disclosure.

Referring to FIG. 12, the electronic device (e.g., electronic device 101 in FIG. 1 and electronic device 201 in FIG. 2) including a multicore (e.g., multicore 210 in FIG. 2 and multicore 410 in FIG. 4) may activate a driver core A with number X among multiple cores of the multicore at operation 1210. At operation 1220, the driver core A with number X in the electronic device may send the packets to a concurrent processing engine. At operation 1230, the driver core A of the electronic device may acquire the location of a network processing core B determined based on the location X of the driver core A and location Y of an application core C.

At operation 1240, the network processing core B corresponding to the location acquired by the electronic device may perform TCP/IP processing on the received packets.

At operation 1250, the electronic device may determine whether the location of the application core C is changed. For example, the electronic device may determine whether the location of the application core C is changed by performing operations described with reference to FIG. 10 or 11.

If it is determined that the location of the application core C is changed at operation 1250, the application core C' with a changed core number W may process the packets TCP/IP-processed by the network processing core B at operation 1270. If it is determined at operation 1250 that the location of the application core C is not changed, the application core C with the core number Y may process the packets TCP/IP-processed by the network processing core B at operation 1260.

According to various embodiments, the electronic device (e.g., electronic device 101 in FIG. 1 and electronic device 201 in FIG. 2) may include a communication device (e.g., communication module 190 in FIG. 1), a multicore (e.g., multicore 210 in FIG. 2) comprised of multiple cores operating in at least one of a driver core A layer, a network processing core B layer, and an application core C layer, a memory (e.g., memory 130 in FIG. 1 and memory 240 in FIG. 2) and a processor (e.g., processor 120 in FIG. 1); the processor may control to check a location of the driver core, as one of multiple cores of the multicore, for sending, when at least one packet is received via the communication device, the packet to the OS domain, a location of the application core processing the packet in the user domain, and a processing amount of a session corresponding to the received packet, determine a location of the network processing core among the cores based on at least one of the location of the driver core, the location of the application core, and the processing amount of the session, and control the network processing core at the determined location among the multiple cores to perform network stack processing on the packet.

According to an embodiment, the processor is configured to determine the location of the network processing core by selecting a core number to control a network processing core layer.

According to an embodiment, the multiple cores are categorized into one of a first cluster type and a second cluster type, and the processor is configured to control to determine a cluster type of the network processing core and determine the location of the network processing core by selecting a core number belonging to the determined cluster type to determine the location of the network processing core.

According to an embodiment, the processor is configured to control to activate a driver core with an arbitrary core number X among the multiple cores, send the packets through the driver core with the core number X to the operating system domain, acquire, at the driver core with the core number X, the determined location of the network processing core, send the packets through the driver core with the core number X to the network processing core with a core number Z based on the acquired location of the network processing core, perform, at the network processing core with the core number Z, network stack processing on the received packets, and process, at the application core with an arbitrary core number Y, the packets processed by the network processing core with the core number Z.

According to an embodiment, the processor is configured to control to process by batching the packets corresponding in amount to a predetermined reference processing amount configured by the network processing core in the operating system domain.

According to an embodiment, the electronic device comprising a concurrent processing engine operating in the operating system domain and configured to generate session identity information of the packets from the driver core, send the session identity information and a core number of the driver core that sends the packets to the concurrent processing engine to the processor, acquire the location of the network processing core from the processor, and send the packets to the network processing core of the determined location.

According to an embodiment, the processor is configured to determine a core number of the network processing core based on at least one of the session identity information of the received packets, the core number of the driver core, the core number of the application core processing the packets, and packet processing amount information of the session and send the core number of the network processing core to the concurrent processing engine, the concurrent processing engine being configured to send the packets to the network processing core corresponding to the received core number.

According to an embodiment, the processor is configured to control to determine a location of the application core by monitoring operations of the application processing the packets based on the session identity information of the packets and change the location of the application core processing the packets among the cores based on a condition of changing the location of the application core being satisfied.

According to an embodiment, the processor is configured to control to identify the location of the application core, based on a determination that a location of a core for an application associated with the packets is designated, with the designated location of the core, determine, based on a determination that the location of the core corresponding to the application associated with the packets is not designated, the location of the application core according to whether the application is running in the foreground or the background, or determine the location of the application core through learning related to packet processing of the application.

Figure 13A:
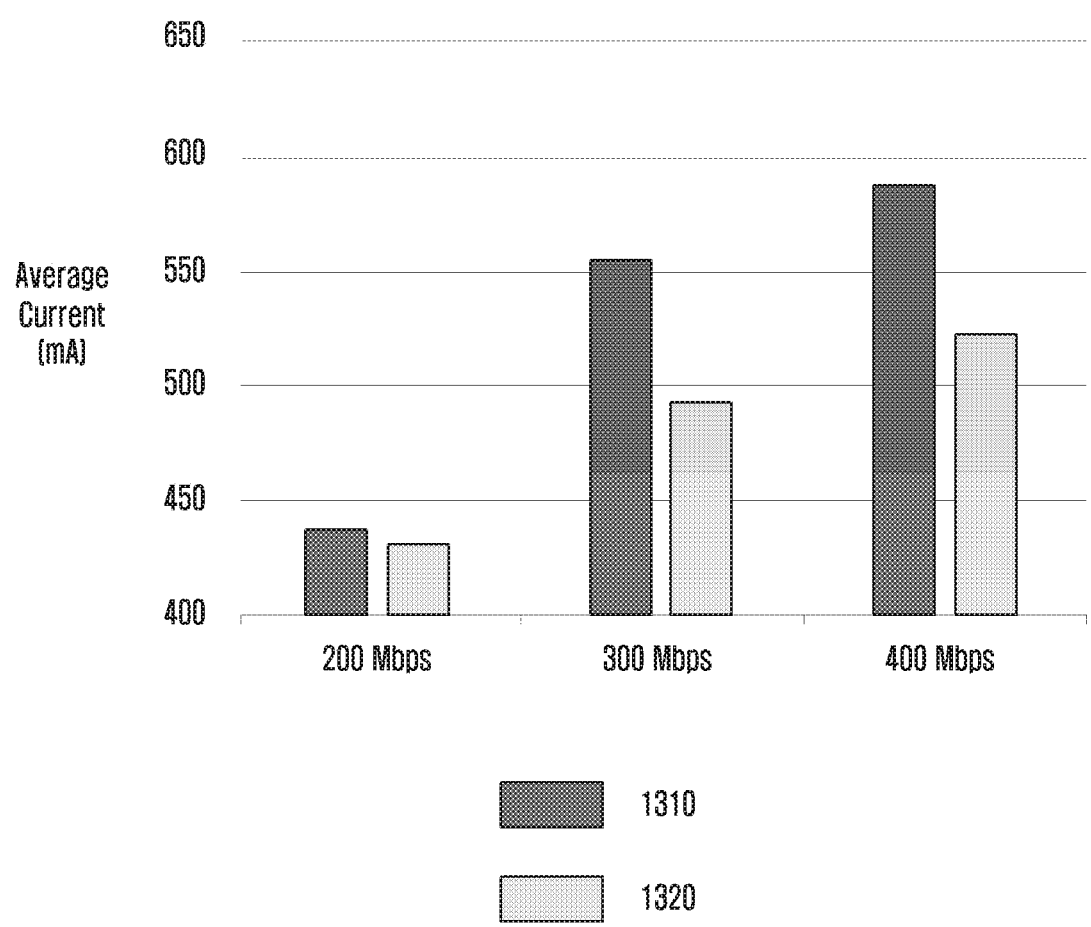
FIGS. 13A, 13B, and 13C are graphs for illustrating effects according to various embodiments of the disclosure.
Figure 13B:
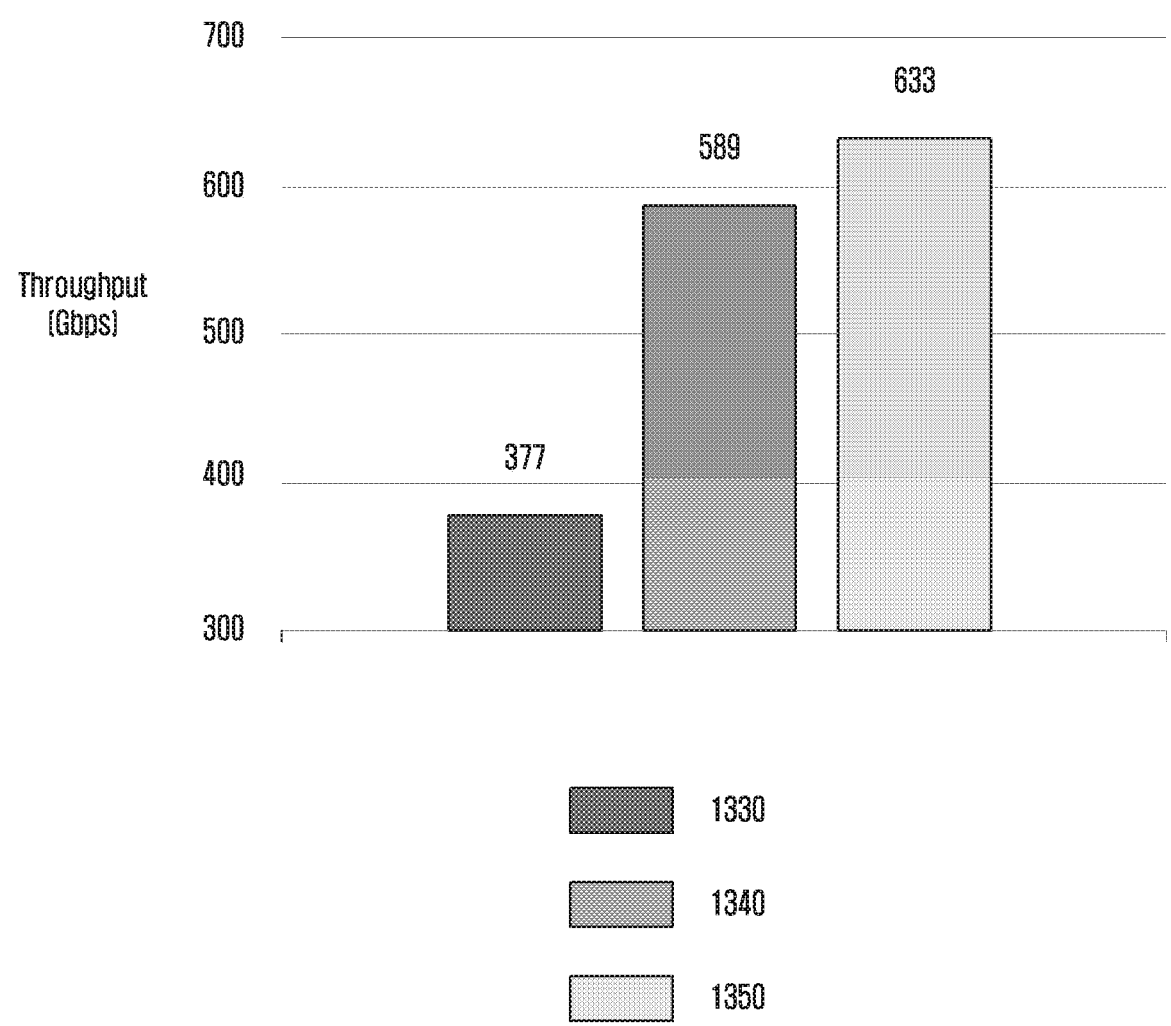
Figure 13C:
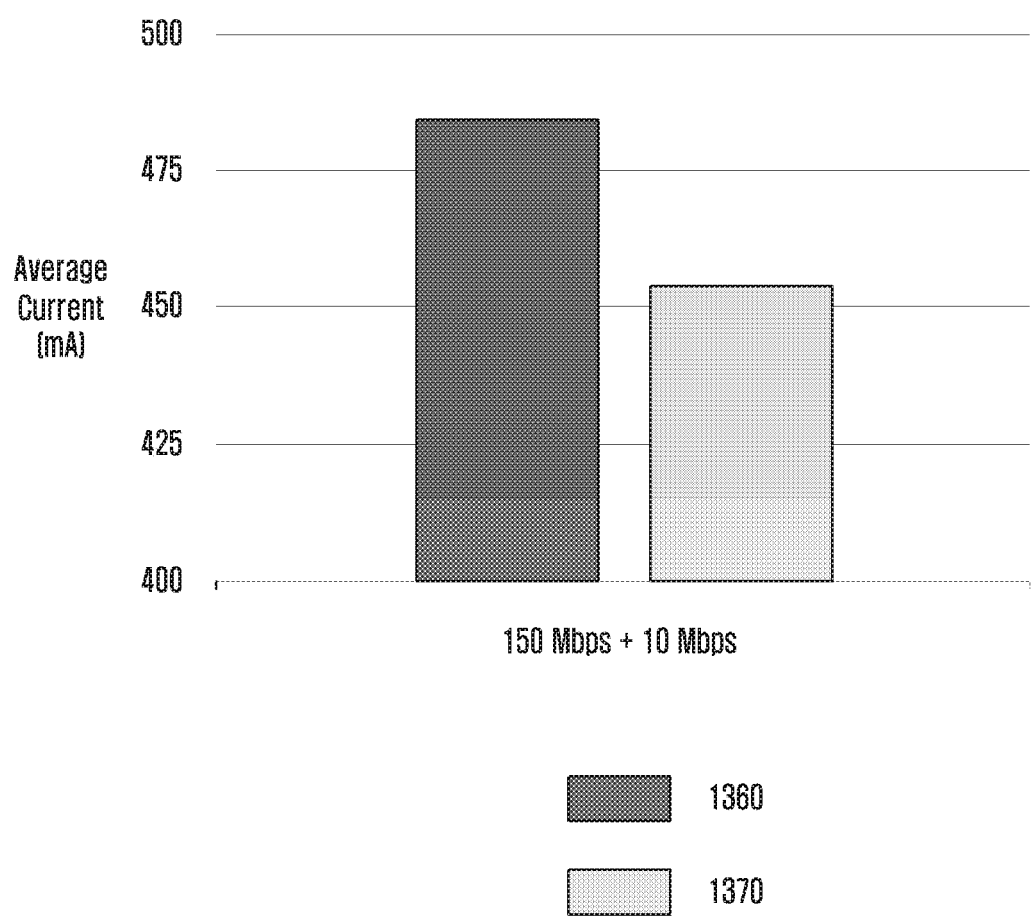

FIGS. 13A, 13B, and 13C are graphs illustrating effects according to various embodiments of the disclosure.

Referring to FIG. 13A, a graph illustrates the electric current consumption of a technology of the related art and the proposed technology for processing the same number of packets during a session in a comparative manner. Reference number 1310 denotes the consumed electric current amount of the technology of the related art for processing the packets, and reference number 1320 denotes the consumed electric current amount of the proposed technology in which the core selected according to one of various disclosed embodiments processes the packets. For example, unlike that technology of the related art that selects a big type core for network stack processing for the case where the packet processing amount of the session is equal to greater than a threshold value, the proposed technology may determine a core for network stack processing based on the locations of the application core and the driver core even when the packet processing amount of the session is equal to or greater than the threshold value. In the case of using the proposed technology, it may be possible to maximize the batch processing effectiveness by determining the core for performing the network stack processing on the received packets in consideration of the processing amount of the session as well as the location information of the application core and the driver core. Referring to FIG. 13A, the proposed technology improves the electric current consumption efficiency by 11% compared with the technology of the related art. FIG. 13B is a graph showing the throughputs of the technologies of the related art and the proposed technology during a session in a comparative manner. Referring to FIG. 13B, reference number 1330 denotes the packet processing amount of the RPS technology of the related art, reference number 1340 denotes the packet processing amount of the related art, and reference number 1350 denotes the packet processing amount of the proposed technology in which the packets are processed by a core determined in consideration of the location of the application core as well as the core for performing network stack processing. For example, in the case of randomly selecting the core for performing network stack processing, it may be possible for a relatively low performance core to perform TCP/IP processing, leading to inefficiency of batch processing on the packets delivered from the driver core. The proposed technology is capable of processing packets efficiently by determining the core for processing the batch-processed packets in consideration of the packet processing amount of a session and locations of the application core and the driver core. Referring to FIG. 13B, the proposed technology improves the packet processing amount by 6~67% compared with the related art, by selecting the layer cores in a way of maximizing the batch processing throughput. FIG. 13C is a graph shown the electric current consumption of the related art and the proposed technology for processing the same number of packets during two sessions in a comparative manner. Reference number 1360 denotes the consumed electric current amount of the related art for processing the packets, and reference number 1370 denotes the consumed electric current amount of the proposed technology in which the core selected according to one of various disclosed embodiments processes the packets. In the case of using the proposed technology, it may be possible to maximize the batch processing effectiveness by determining the location of the core for processing the packets per session, unlike the related art. Referring to FIG. 13C, the proposed technology improves the electric current consumption efficiency by 6% compared with the related art.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device including a multicore comprising:
   a communication circuit;
   a multicore including a plurality of cores, each core being configured to process data; and
   a memory storing execution instructions which, when executed, cause one of the plurality of cores to:
      while processing data of packets received by the communication circuit, identify a processing amount of the packets and a session identity (ID) of the packets,
      based on the processing amount, a location of a second core that processes application data associated with the session ID of the packets, and a location of a third core that processes driver data associated with the session ID of the packets, identify a location of a first core that processes network data of the packets, the location of the first core including information indicating a core number of the first core and a core type of the first core, the core type indicating a categorization of performance, and
      based on the processing amount being equal to or greater than a predetermined level, change the location of the second core that processes application data to be identical to the location of the first core that processes network data,
   wherein the first core operates in a lower layer than the second core,
   wherein the predetermined level is determined according to at least one of the location of the second core, whether an application associated with the packets is running in a foreground or a background, or a learning process related to the packet processing of the application, and wherein the changing of the location of the second core comprises selecting a core number of a type having at least one of a same performance or higher performance than the core type of the first core.

2. The electronic device of claim 1, wherein the instructions, when executed, further cause the one of the plurality of cores to:
activate the third core among the plurality of cores that processes driver data of the packets,
acquire, via the third core, the location of the first core, and
based on the location of the first core, send the packets to the first core through the third core.

3. The electronic device of claim 2, further comprising:
a concurrent processing engine and a core management controller,
wherein the instructions, when executed, cause the concurrent processing engine to:
generate session identity information of packets received from the third core,
send the session identity information and a core number of the third core to the core management controller,
acquire the location of the first core from the core management controller, and
send the packets received from the third core to the first core at the acquired location.

4. The electronic device of claim 3, wherein the instructions, when executed, further cause the one of the plurality of cores to:
monitor operations of the application associated with the packets and the session identity information of the packets, and
change the location of the second core based on a condition of changing the location of the second core being satisfied.

5. The electronic device of claim 4, wherein the instructions, when executed, further cause the one of the plurality of cores to at least one of:
based on a determination that a location of a core for the application associated with the packets is a designated location, identify the location of the second core as the designated location of the core,
in case that the location of the core corresponding to the application is not the designated location, determine the location of the second core according to whether the application is running in the foreground or the background, or
determine the location of the second core through a learning process that is related to packet processing of the application.

6. The electronic device of claim 3, wherein the instructions, when executed, cause the core management controller to:
determine the core number of the first core based on at least one of the session identity information, the core number of the third core, a core number of the second core, or packet processing amount information of the session identity information, and
send at least one core number of the first core and the second core to the concurrent processing engine.

7. The electronic device of claim 1,
wherein each core is categorized into one of a first type or a second type, and wherein the first type is one of a big core or a little core and the second type is another of the big core or the little core.

8. The electronic device of claim 1, wherein the instructions, when executed, further cause the one of the plurality of cores to:
batch and process, via the first core operating in the lower layer than the second core, an amount of packets corresponding to a predetermined reference processing amount of the first core, and
send, via the first core to the second core operating in a higher layer than the first core, the batched and processed packets.

9. An electronic device comprising:
a communication circuit;
a multicore comprising a plurality of cores, each core being configured to process data;
a processor; and
a memory storing instructions which, when executed, cause the processor to:
while processing data of packets received by the communication circuit, identify a processing amount of the packets and a session identity (ID) of the packets,
based on the processing amount, a location of a second core that processes application data associated with the session ID of the packets, and a location of a third core that processes driver data associated with the session ID of the packets, identify a location of a first core that processes network data of the packets, the location of the first core including information indicating a core number of the first core and a core type of the first core, the core type indicating a categorization of performance, and
based on the processing amount being equal to or greater than a predetermined level, change the location of the second core that processes application data to be identical to the location of the first core that processes network data,
wherein the first core operates in a lower layer than the second core,
wherein the predetermined level is determined according to at least one of the location of the second core, whether an application associated with the packets is running in a foreground or a background, or a learning process related to the packet processing of the application, and
wherein the changing of the location of the second core comprises selecting a core number of a type having at least one of a same performance or higher performance than the core type of the first core.

10. The electronic device of claim 9, further comprising:
a concurrent processing engine operating in an operating system domain,
wherein the instructions, when executed, cause the concurrent processing engine to:
generate session identity information of the packets from the third core,
send the session identity information and a core number of the third core to a core management controller,
acquire the location of the first core from the core management controller, and
send the packets received from the third core to the first core at the acquired location.

11. The electronic device of claim 10, wherein the instructions, when executed, further cause the processor to:
determine the core number of the first core based on at least one of the session identity information, the core number of the third core, a core number of the second core, and packet processing amount information of the session identity information, and send at least one core number of the first core and the second core to the concurrent processing engine.

12. The electronic device of claim 11, wherein the instructions, when executed, further cause the processor to:

control to monitor operations of the application associated with the packets based on the session identity information of the packets, and change the location of the second core processing the packets among the cores based on a condition of changing the location of the second core being satisfied.

13. The electronic device of claim 12, wherein the instructions, when executed, further cause the processor to at least one of:

based on a determination that a location of a core is a designated location for executing the application associated with the packets, identify the location of the second core as the designated location, based on a determination that the location of the core corresponding to the application associated with the packets is not a designated location, determine the location of the second core according to whether the application is running in the foreground or the background, or determine the location of the second core through a learning process related to packet processing of the application.

14. The electronic device of claim 13, wherein the instructions, when executed, further cause the processor to:

determine the location of the second core based on a processing requirement of the application.

15. The electronic device of claim 9, wherein each core is categorized into one of a first type or a second type, and wherein the first type is one of a big core or a little core and the second type is another of the big core or the little core.

16. The electronic device of claim 9, wherein the instructions, when executed, further cause the processor to:

control to activate the third core among the plurality of cores that processes driver data of the packets, acquire, via the third core, the location of the first core, and send the packets to the first core through the third core based on the location of the first core.

17. The electronic device of claim 9, wherein the instructions, when executed, further cause the processor to:

control to batch and process, via the first core, packets corresponding to a predetermined reference processing amount that is configured by the first core, and send the batched and processed packets to the second core.

18. The electronic device of claim 9, wherein the changing of the location of the second core that processes application data to be identical to the location of the first core that processes network data of the packets comprises changing the location of the second core to another location by reflecting a location of a predetermined core.

* * * * *